(12) United States Patent
Schneider

(10) Patent No.: US 6,442,549 B1
(45) Date of Patent: *Aug. 27, 2002

(54) METHOD, PRODUCT, AND APPARATUS FOR PROCESSING REUSABLE INFORMATION

(76) Inventor: Eric Schneider, 13944 Cedar Rd. #258, University Heights, OH (US) 44118

( * ) Notice: Subject to any disclaimer, the term of this patent is extended or adjusted under 35 U.S.C. 154(b) by 0 days.

This patent is subject to a terminal disclaimer.

(21) Appl. No.: 09/440,606

(22) Filed: Nov. 15, 1999

Related U.S. Application Data

(63) Continuation-in-part of application No. 08/900,437, filed on Jul. 25, 1997, now Pat. No. 5,987,464.
(60) Provisional application No. 60/154,411, filed on Sep. 17, 1999.

(51) Int. Cl.[7] .............................................. G06F 17/30
(52) U.S. Cl. .......................... 707/10; 707/100; 707/103; 707/104; 709/217; 709/218; 709/201; 709/203; 705/21
(58) Field of Search .......................... 707/10, 103, 104, 707/100; 709/223, 201, 203, 217, 218

(56) References Cited

U.S. PATENT DOCUMENTS

| | | | |
|---|---|---|---|
| 4,823,265 A | | 4/1989 | Nelson |
| 4,956,771 A | * | 9/1990 | Neustaedter ................. 707/10 |
| 5,155,837 A | | 10/1992 | Liu et al. |
| 5,155,847 A | | 10/1992 | Kirouac et al. |
| 5,175,681 A | | 12/1992 | Iwai et al. |
| 5,231,570 A | | 7/1993 | Lee |
| 5,249,230 A | | 9/1993 | Mihm, Jr. |
| 5,249,275 A | | 9/1993 | Srivastava |
| 5,319,699 A | | 6/1994 | Kerihuel et al. |
| 5,386,369 A | | 1/1995 | Christiano |
| 5,402,490 A | | 3/1995 | Mihm, Jr. |
| 5,404,505 A | | 4/1995 | Levinson |
| 5,437,031 A | * | 7/1995 | Kitami ....................... 395/650 |
| 5,444,823 A | | 8/1995 | Nguyen |
| 5,592,620 A | | 1/1997 | Chen et al. |
| 5,600,778 A | | 2/1997 | Swanson et al. |
| 5,603,034 A | | 2/1997 | Swanson |
| 5,623,679 A | | 4/1997 | Rivette et al. |
| 5,623,681 A | | 4/1997 | Rivette et al. |
| 5,625,818 A | | 4/1997 | Zarmer et al. |

(List continued on next page.)

OTHER PUBLICATIONS

Goodin, Dan, "NSI domain slowdown persists", CNET News, from //news.cnet.com/news/0-1005-200-337495.html, Jan. 19, 1999 printed pp. 1–2.
Goodin, Dan, "NSI confirms database revisions", CNET News, from news.cnet.com/news/0-1005-200-337668.html, Jan. 21, 1999, printed pp. 1–2.
Oakes, Chris, "NetSol, ICANN Reach Accord", Wired News, from wired.com/news/politics/0,1283,31557,00.html, Sep. 29, 1999 printed pp. 1–3.

*Primary Examiner*—Frantz Coby

(57) ABSTRACT

In a communication network having at least one communication link connecting a provider and a client, wherein the provider is in communication with a registrar storing one or more identifiers such as potentially available or soon to be available telephone numbers or domain names, a method includes communicating from the provider to the client the one or more identifiers wherein each identifier is not available for registration at the time of the communication (e.g., client renders a web page of identifiers communicated from provider, which could be pushed to client or provided in response to a search, navigation, or query), selecting at least one identifier from the one or more identifiers, and at least one of a reserving, subscribing, reserving in a pre-ordering queue, pre-ordering, pre-registering, ordering, and monitoring the at least one selected identifier with the provider, wherein the at least one selected identifier is communicated to the provider before the at least one selected identifier is available for registration.

42 Claims, 23 Drawing Sheets

U.S. PATENT DOCUMENTS

| | | |
|---|---|---|
| 5,634,016 A | 5/1997 | Steadham, Jr. et al. |
| 5,640,561 A | 6/1997 | Satoh et al. |
| 5,684,715 A * | 11/1997 | Palmer .................... 364/514 |
| 5,692,132 A | 11/1997 | Hogan |
| 5,699,428 A | 12/1997 | McDonnal et al. |
| 5,701,399 A | 12/1997 | Lee et al. |
| 5,708,709 A | 1/1998 | Rose |
| 5,742,818 A | 4/1998 | Shoroff et al. |
| 5,802,524 A | 9/1998 | Flowers et al. |
| 5,841,850 A * | 11/1998 | Fan ............................ 379/142 |
| 5,895,454 A * | 4/1999 | Harrington .................. 705/26 |
| 5,953,721 A | 9/1999 | Doi et al. |
| 5,982,863 A * | 11/1999 | Smiley et al. .............. 379/112 |
| 5,987,464 A * | 11/1999 | Schneider .................... 707/10 |
| 6,098,099 A * | 8/2000 | Elllesson et al. ........... 709/223 |

\* cited by examiner

| DATE | Min 4 | Max 4 | Min 8 | Max 8 | Min 12 | Max 12 |
|---|---|---|---|---|---|---|
| 1996-12-31 | 5155863 | 5157786 | 4777665 | 4779287 | 4477927 | 4479266 |
| 1996-12-24 | 5153938 | 5155862 | 4776042 | 4777664 | 4476587 | 4477926 |
| 1996-12-17 | 5152013 | 5153937 | 4774723 | 4776041 | 4475247 | 4476586 |
| 1996-12-10 | 5150475 | 5152012 | 4773100 | 4774722 | 4473907 | 4475246 |
| 1996-12-03 | 5148549 | 5150474 | 4771477 | 4773099 | 4472835 | 4473906 |
| 1996-11-26 | 5146621 | 5148548 | 4769854 | 4771476 | 4471495 | 4472834 |
| 1996-11-19 | 5144694 | 5146620 | 4768231 | 4769853 | 4470155 | 4471494 |
| 1996-11-12 | 5142702 | 5144693 | 4766608 | 4768230 | 4468815 | 4470154 |
| 1996-11-05 | 5140707 | 5142701 | 4764985 | 4766607 | 4467475 | 4468814 |
| 1996-10-29 | 5138714 | 5140706 | 4763362 | 4764984 | 4466135 | 4467474 |
| 1996-10-22 | 5136721 | 5138713 | 4761834 | 4763361 | 4464795 | 4466134 |
| 1996-10-15 | 5134725 | 5136720 | 4760610 | 4761833 | 4463455 | 4464794 |
| 1996-10-08 | 5133084 | 5134724 | 4759082 | 4760609 | 4462115 | 4463454 |
| 1996-10-01 | 5131093 | 5133083 | 4757554 | 4759081 | 4461043 | 4462114 |
| 1996-09-24 | 5129101 | 5131092 | 4756026 | 4757553 | 4459703 | 4461042 |
| 1996-09-17 | 5127105 | 5129100 | 4754498 | 4756025 | 4458363 | 4459702 |
| 1996-09-10 | 5125113 | 5127104 | 4752970 | 4754497 | 4457023 | 4458362 |
| 1996-09-03 | 5123113 | 5125112 | 4751746 | 4752969 | 4455683 | 4457022 |
| 1996-08-27 | 5121505 | 5123112 | 4750218 | 4751745 | 4454611 | 4455682 |
| 1996-08-20 | 5119510 | 5121504 | 4748690 | 4750217 | 4453271 | 4454610 |
| 1996-08-13 | 5117506 | 5119509 | 4747162 | 4748689 | 4451931 | 4453270 |
| 1996-08-06 | 5115516 | 5117505 | 4745634 | 4747161 | 4450591 | 4451930 |
| 1996-07-30 | 5113526 | 5115515 | 4744106 | 4745633 | 4449251 | 4450590 |
| 1996-07-23 | 5111536 | 5113525 | 4742578 | 4744105 | 4447911 | 4449250 |
| 1996-07-16 | 5109546 | 5111535 | 4741050 | 4742577 | 4446571 | 4447910 |
| 1996-07-09 | 5107542 | 5109545 | 4739522 | 4741049 | 4445231 | 4446570 |
| 1996-07-02 | 5105473 | 5107541 | 4737994 | 4739521 | 4443891 | 4445230 |

FIG. 7B

| DATE | 4 | 8 | 12 | Total | Bytes | | M 8 | M 12 | Bits | E-Mail |
|---|---|---|---|---|---|---|---|---|---|---|
| 1996-12-31 | 1924 | 1623 | 1340 | 4887 | 611 | | 1289 | 789 | 4002 | 501 |
| 1996-12-24 | 1925 | 1623 | 1340 | 4888 | 611 | | 1283 | 787 | 3995 | 500 |
| 1996-12-17 | 1925 | 1319 | 1340 | 4584 | 573 | | 1050 | 770 | 3745 | 469 |
| 1996-12-10 | 1538 | 1623 | 1340 | 4501 | 563 | | 1328 | 793 | 3659 | 458 |
| 1996-12-03 | 1926 | 1623 | 1072 | 4621 | 578 | | 1310 | 653 | 3889 | 487 |
| 1996-11-26 | 1928 | 1623 | 1340 | 4891 | 612 | | 1284 | 769 | 3981 | 498 |
| 1996-11-19 | 1927 | 1623 | 1340 | 4890 | 612 | | 1278 | 798 | 4003 | 501 |
| 1996-11-12 | 1992 | 1623 | 1340 | 4955 | 620 | | 1309 | 798 | 4099 | 513 |
| 1996-11-05 | 1995 | 1623 | 1340 | 4958 | 620 | | 1299 | 805 | 4099 | 513 |
| 1996-10-29 | 1993 | 1623 | 1340 | 4956 | 620 | | 1312 | 821 | 4126 | 516 |
| 1996-10-22 | 1993 | 1528 | 1340 | 4861 | 608 | | 1214 | 764 | 3971 | 497 |
| 1996-10-15 | 1996 | 1224 | 1340 | 4560 | 570 | | 1017 | 763 | 3776 | 472 |
| 1996-10-08 | 1641 | 1528 | 1340 | 4509 | 564 | | 1218 | 779 | 3638 | 455 |
| 1996-10-01 | 1991 | 1528 | 1072 | 4591 | 574 | | 1235 | 613 | 3839 | 480 |
| 1996-09-24 | 1992 | 1528 | 1340 | 4860 | 608 | | 1235 | 827 | 4054 | 507 |
| 1996-09-17 | 1996 | 1528 | 1340 | 4864 | 608 | | 1237 | 781 | 4014 | 502 |
| 1996-09-10 | 1992 | 1528 | 1340 | 4860 | 608 | | 1221 | 823 | 4036 | 505 |
| 1996-09-03 | 2000 | 1224 | 1340 | 4564 | 571 | | 1008 | 818 | 3826 | 479 |
| 1996-08-27 | 1608 | 1528 | 1072 | 4208 | 526 | | 1252 | 622 | 3482 | 436 |
| 1996-08-20 | 1995 | 1528 | 1340 | 4863 | 608 | | 1268 | 798 | 4061 | 508 |
| 1996-08-13 | 2004 | 1528 | 1340 | 4872 | 609 | | 1272 | 823 | 4099 | 513 |
| 1996-08-06 | 1990 | 1528 | 1340 | 4858 | 608 | | 1231 | 793 | 4014 | 502 |
| 1996-07-30 | 1990 | 1528 | 1340 | 4858 | 608 | | 1245 | 811 | 4046 | 506 |
| 1996-07-23 | 1990 | 1528 | 1340 | 4858 | 608 | | 1247 | 799 | 4036 | 505 |
| 1996-07-16 | 1990 | 1528 | 1340 | 4858 | 608 | | 1252 | 818 | 4060 | 508 |
| 1996-07-09 | 2004 | 1528 | 1340 | 4872 | 609 | | 1247 | 837 | 4088 | 511 |
| 1996-07-02 | 2069 | 1528 | 1340 | 4937 | 618 | | 1247 | 839 | 4155 | 520 |

4 =    Total Patents Issued in a given week 4 years ago.
8 =    Total Patents Issued in a given week 8 years ago.
12 =    Total Patents Issued in a given week 12 years ago.
Total =    (4+8+12 columns)    Total Patents that can potentially expire in a given week.
Bytes =    (4+8+12 columns)/8    represents the maximum minimized transmission in Bytes of data needed to complete delivery.

M8 =    Modified Total of 8 year patents that can expire in a given week.
   (a portion of the 8 year patents have already expired 4 years ago)
M12 =    Modified Total of 12 year patents that can expire in a given week.
   (a portion of the 12 year patents have already expired 4 and 8 years ago)
Bits =    Represents a modified total number of patents that can potentially expire in a given week.
E-Mail =    Represents a modified minimized final delivery of data in Bytes.

FIG. 10A

METHOD, PRODUCT, AND APPARATUS FOR PROCESSING REUSABLE INFORMATION

RELATED APPLICATIONS

This application claims the benefit of the following patent applications, which are hereby incorporated by reference:
1. U.S. Provisional Application Ser. No. 60/154,411 filed Sep. 17, 1999, by Schneider entitled "Method and apparatus for the notification of new resources."
2. U.S. patent application Ser. No. 08/900,437 filed Jul. 25, 1997, by Schneider entitled "Method and apparatus for periodically updating data records having an expiry time", now U.S. Pat. No. 5,987,464.

FIELD OF THE INVENTION

This invention generally relates to a method and system of information delivery, and more specifically relates to a method, product, and apparatus for processing reusable information.

BACKGROUND OF THE INVENTION

In exchange for disclosure of an invention, the issuance of a U.S. patent is a twenty year grant from the time filed by the government of a property right to the inventor to exclude others from making, using, or selling the invention', with the patentee losing rights to the invention upon expiration. Title 37 Code of Federal Regulations (CFR), Section 1.362(d) provides that maintenance fees may be paid without surcharge for the six-month period beginning three, seven, and eleven years after the date of issue of patents based on applications filed on or after Dec. 12, 1980. An additional six-month grace period is provided by 35 U.S.C. 41(b) and 37 CFR 1.362(e) for payment of the maintenance fee with the surcharge set forth in 37 CFR 1.20(h), as amended effective Dec. 16, 1991. If the maintenance fee is not paid in the patent requiring such payment the patent will expire on the fourth, eighth, or twelfth anniversary of the grant. Eleven years since the first premature patent expiration in December 1985, over 275,000 patents have prematurely expired and entered the public domain with additional 1,000 patents prematurely expiring each week.

A common use of patent information and an early step in assessing the patentability of an invention is to perform prior art searches of existing patents. To assist patent examiners, the Automated Patent System (APS) was implemented in April of 1984 by the U.S. Patent and Trademark Office (PTO) with over 400 million dollars of taxpayer money to provide sophisticated centralized on-line search capabilities. By accessing the APS database from a computer, an examiner can select patents for review based on the occurrence of specified words or phases, in particular combinations, in the document. The U.S. Congress has long recognized the importance of information dissemination to the PTO's mission. The PTO enabling legislation has several sections addressing information dissemination; the most relevant of these being the requirements that the PTO provide the public with direct access to its search systems. Consequently, the APS database has been available to the public in the PTO Public Search Room since 1990 and, initially on an experimental basis, in 14 of the 74 Patent and Trademark Depository Libraries since 1992.

U.S. patents offered by commercial data vendors is based on data furnished by the PTO. At present, the most prevalent mode of transferring data to the vendor community from the PTO is in the form of files on magnetic tape. For example, the PTO offers copies of the tapes that contain the text used as input in the building of the APS database. The premature expiration of a patent has never been a search requirement for the patent examiner. As a result, there has been no need for the PTO to incorporate this new reference information into the APS database. Currently, the APS database is the representation of the original library files of patent text data at the time of issuance and does not provide a data field for the premature expiration status of a patent. Though this is the primary source of data provided for sale by the PTO, commercial data vendors in turn have not recognized the potentially unrealized value of premature expiration information.

It is government's responsibility to publish what the public can not make, use, or sell. Aside from disclosure of the full patent document, the government also publishes the front-page information of the patent document in the Official Gazette. The following is from Chapter 2575 of the Manual of Patent Examining Procedure (MPEP) Sixth Edition, Revision 1, September 1995.

A notice will appear in each issue of the Official Gazette which will indicate which patents have been granted 3, 7, and 11 years earlier, that the window period has opened, and that maintenance fee payments will now be accepted for those patents. Another Official Gazette notice published after expiration of the grace period will indicate any patent that has prematurely expired due to nonpayment of maintenance fees and any patents that have been reinstated. An annual compilation of such expirations and reinstatements will also be published.

This passage denotes the intention of government to publish what the public can make, use, or sell. All patents prior to December 1985 expire seventeen years after being granted. For example, if it is the first week of the year 1996 and the public wanted to read what patents had just expired, one would look at the Official Gazette from the first week of 1979. Essentially a book published seventeen years ago would be retrieved. For the first 195 years of the U.S. Patent System, there was no need to republish or compile expired patent information because it was previously published by default.

On Dec. 10, 1985, nearly 200 years since the first patent issued, the Official Gazette (OG) Notice had listed U.S. Pat. No. 4,291,808 to become the first patent ever to prematurely expire for failure to pay maintenance fees. Since then, the PTO has published weekly in the OG notices the patent numbers of the expiring patents. The release of the patent numbers only, limits the public to a manual, exhaustive, and inefficient cross-referenced retrieval of the newest patent documents that have prematurely expired, thereby creating for the first time a new need to compile this information. In 1987, the PTO released a series of CD-ROM subscription products including the Classification and Search Support Information System Bibliographic disc (CASSIS-BIB). This disc offers the search and retrieval of title-only patent information dating back to 1969. The subscriber can search for the status of a patent (withdrawn, reinstated, abandoned, or prematurely expired) and view the most current list of premature expired patents. Although the release of the CASSIS-BIB disc can help with the search of patent expirations and allows the subscriber the privacy and cost benefits of such a system, searching is limited to patent titles only, the disc is updated every two months and is not cost effective to update more frequently.

Because of significant changes in technology, revisions to the Office of Management and Budget (OMB) Circular A-130, and the passage of the Paperwork Reduction Act of 1995 (Public Law 104-13), public access has further expanded through a variety of programs administered by the PTO's Office of Information Dissemination to include the access of patent and trademark information made available via the Internet and PTO Bulletin Board System (PTO-BBS). Upon browsing Internet sites, patent servers at the Center for Networked Information Discovery and Retrieval (CNIDR), Community of Science, Chemical Abstracts Society (CAS), and IBM to name a few,. have all neglected to allow searching for the expiration status of a patent. The IBM Patent Server has come closest to this accomplishment where on Jun. 4, 1997, a maintenance. status field was integrated into the database which lists the status of a patent upon retrieval only, and is not yet a searchable field.

In November of 1994 the PTO established an on-line BBS. The PTO began to list exclusive files of premature expired patent numbers weekly and list master files of premature expired patent numbers every two months. The patent numbers are published in natural ascending order, and for more than ten years have been keyed in manually by the PTO. As a result, it is not uncommon to see occasional errors like the reversal of digits within the patent number based on an operator's manual entry. In 1995, the PTO added the release of the OG Notices on-line. In the OG Notice on Feb. 6, 1996, the PTO published the premature expired patent numbers for the week of Feb. 13, 1996 instead of the current week. On Mar. 12, 1996 the OG corrected the omission while the PTO-BBS did not. Since then, the exclusive files have been reported one week ahead of the OG Notices upon issue. The master list of premature expired patent numbers released on the PTO-BBS for Dec. 31, 1996 omitted about 6,000 premature expired patent numbers. This omission represents the eight and twelve year expirations since the previous master list on Oct. 31, 1996. This omission is in turn reflected in the December 1996 issue of the CASSIS-BIB CD-ROM.

There were further omissions in the February 1997 issue and the CASSIS-BIB subscription disc does not remain corrected to this date. In May 1997, the PTO-BBS shut down due to a diminished user base and the increasing popularity of the Internet. The above inconsistencies indicate that there is no system for detecting error or omission that may be subject to manual labor or clerical errors. The issuance of the premature expired patent numbers by the PTO has now become questionable in regard to method, policy, and accuracy of its use.

As previously discussed in co-pending patent application Ser. No. 08/900,437 filed Jul. 25, 1997 now U.S. Pat No. 5,987,464 the applications of information delivery and updating extend far beyond the field of patent information. For instance, new information generated from the renewed availability of old information is also applicable to any forfeited property (real or intellectual) including real estate, trademarks, copyrights, domain names, and telephone numbers too name a few.

Name space is a set of names in which all names are unique. Address space is a set of addresses in which all addresses are unique. Names are commonly used as mnemonic devices to help remember information. For instance, names are used to remember telephone numbers, and domain names are used to remember Internet addresses.

Currently, national phone numbers take the form of an international dialing code, area code, prefix, and number (e.g. 1-212-555-1212). During the turn of the century, phone companies built "exchanges" known as Central Offices to serve a certain geographical area. The exchange was named after the first prefix installed in that office. Before phones had dials on them, an operator connected the caller's request to the name of the exchange and number, such as Spring 3456 or Pennsylvania 5000. In the late 1920's, once dials started appearing on phones, a caller could connect the phone number by first dialing the first three letters of the exchange and then the number. For example, the caller would dial the S-P-R in Spring and then the 3456 or the P-E-N in Pennsylvania 5000. Back then, phone numbers were written with the dialed letters capitalized such as SPRing 3456 and PENnsylvania 5000, as a mnemonic device.

By the 1930s, large cities were dropping the third letter from the dialing routine and replacing it with a number, in order to increase the available numbers for each exchange. So numbers such as SPRing 3456 would become SPring2-3456 and PENnsylvania 5000 would become PEnnsylvania6-5000. This simple change added 80,000 new numbers to existing exchanges. Exchange names helped foster a sense of place, and community, in the same way that cities do. For over 30 years exchange names were published in phone directories and had become common use worldwide.

As is known in the art, telephone calls are routed from a calling Subscriber to a called Subscriber through a network of switches. Subscribers connected to a common switch, are assigned a unique directory number, NXX-XXXX, where "N" refers to any digit except 0 or 1 and "X" refers to any one of 10 digits. As is also known in the art, the telephone system divides the United States into "area codes"; more technically referred to as Numbering Plan Area (NPA) codes. When a call is made from one "area code" to another "area code", the three digit Numbering Plan Area code, NPA, prefix must be supplied to the called Subscriber's directory number (DN). Thus, in effect, each telephone Subscriber is associated with a unique ten digit directory number; NPA-NXX-XXXX.

By the early 1960's, area codes were being used up faster than was predicted in 1947 when the area code scheme was finalized as part of the North American Numbering Plan (NANP). As a result, exchange names were continually being reassigned causing confusion and aggravation in communities throughout major cities in the country. During the early 1970's, as exchange names were phased out and 1-800 toll free numbers introduced, industry recognized and extended the use of mnemonics for commercial advertising and name branding. During the 1980's, 1-800 names were popularized to the point where brokers would buy names with the hope of selling or leasing the 1-800 names from their growing portfolio. In fact, courts have almost unanimously held that telephone mnemonics may be protected as trademarks. In recent years, the shortage of seven letter names used as a mnemonic device led to the strategy for obtaining telephone numbers that correspond to eight and nine letter names. In recent years, two new toll free exchanges (1-888, 1-877) were added because of the saturation of 1-800 numbers. Exchange names are but one example of name space. A recent area of worldwide concern is the allocation of name space on the Internet.

The Internet is a vast computer network having many smaller networks that span the entire world. A Network is a distributed communicating system of computers that are interconnected by various electronic communication links and computer software protocols. Because of the Internet's distributed and open network architecture, it is possible to transfer data from one computer to any other computer world wide. In 1991, the World-Wide Web (Web or WWW), revolutionized the way information is managed and distributed through the Internet.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may provide the data and a client computer may display or process it. TCP may then convert messages into streams of packets at the source, then reassembles them back into messages at the destination. Internet Protocol (IP) handles the addressing, seeing to it that packets are routed across multiple nodes and even across multiple networks with multiple standards. HTTP protocol permits client systems connected to the Internet to access independent and geographically scattered server systems also connected to the Internet. Client side browsers, such as Netscape Navigator or Microsoft Internet Explorer provide efficient graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page.

A web page is static when it requires no variables to display information or link to other predetermined web pages. A web page is dynamic when arguments are passed which are either hidden in the web page or entered from the client browser to supply the necessary inputs displayed on the web page. Common Gateway Interface (CGI) is a standard for running external programs from a web server. CGI specifies how to pass arguments to the executing program as part of the HTTP server request. Commonly, a CGI script can take the name and value arguments from an input form of a first web page which is be used as a query to access a database server and generate an HTML web page with customized data results as output that is passed back to the client browser for display.

The Web is a method of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which can be displayed on a computer monitor. Hosts running special servers provide the Web pages. Software that runs these Web servers is relatively simple and is available on a wide range of computer platforms including PC's. Equally available is a form of client software, known as a Web browser, which is used to display Web pages as well as traditional non-Web files on the client system.

A Uniform Resource Identifier (URI) is a compact string of characters for identifying an abstract or physical resource. URIs, is the generic set of all names and addresses that refer to objects on the Internet. URIs that refer to objects accessed with existing protocols are known as URLs. A URL is the address of a file accessible on the Internet. The URL contains the name of the protocol required to access the resource, a domain name or IP address that identifies a specific computer on the Internet, and a hierarchical description of a file location on the computer. For example the URL "http://www.example.com/index.html", where "http:" is the scheme or protocol, "//www.example.com" is the fully qualified domain name FQDN), and "/index.html" is the filename located on the server.

Because an Internet address is a relatively long string of numbers (e.g., 31.41.59.26) that is difficult to remember, Internet users rely on domain names, memorable and sometimes catchy words corresponding to these numbers, in order to use electronic mail (e-mail) and to connect to Internet sites on the Web. The Domain Name System (DNS) is a set of protocols and services on a network that allows users to utilize domain names when looking for other hosts (e.g. computers) on the network. DNS is composed of a distributed database of names. The names in the DNS database establish a logical tree structure called the domain name space. Each node or domain in the domain name space is named and can contain subdomains. Domains and subdomains are grouped into zones to allow for distributed administration of the name space.

A domain name includes two parts: a host and a domain. Technically, the letters to the right of the "dot" (e.g., unames.com) are referred to as Top Level Domains (TLDs), while hosts, computers with assigned IP addresses that are listed in specific TLD registries are known as second-level domains (SLDs). For the domain name "unames.com"; ".com" is the TLD and "unames" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "my.unames.com", are subsidiary to TLDs in the hierarchy of the Internet's DNS. There are two types of top-level domains, generic and country code.

Generic top-level domains (gTLDs) were created to allocate resources to the growing community of institutional networks, while country code top-level domains (ccTLDs) were created for use by each individual country, as deemed necessary. More than 200 national, or country-code TLDs. (e.g. United States (.us), Japan (.jp), Germany (.de) etc.) are administered by their corresponding governments or by private entities with the appropriate national government's acquiescence. A small set of gTLDs does not carry any national identifier, but denote the intended function of that portion of the domain space. For example, ".com" was established for commercial networks, ".org" for not-for-profit organizations, and ".net" for network gateways. The set of gTLDs was established early in the history of the DNS and has not been changed or augmented in recent years (COM, ORG, GOV, and MIL were created by January 1985, NET in July 1985, and INT was added in November 1988).

The DNS is operated by a Network Information Center (NIC) in each country to act as authority for administering the respective ccTLD zone file portion of the DNS database. The Internet Network Information Center (InterNIC), which administered by the National Science Foundation (NSF), was formed to preside as authority over the gTLD zone files. In 1993, InterNIC was privatized and Network Solutions Inc. (NSI) perform the registration and propagation of these key gTLDs, under a five-year cooperative agreement with the NSF. This agreement now extended to March 2000 was to have originally expired March 1998.

Beginning Sep. 14, 1995, the Cooperative Agreement directed the Registrar to require direct payment from domain name applicants/registrants for registration and renewal re-registration) of the domain names at the second level of the five listed top-level domains. New registrations are in effect for a two-year period. Near the end of the initial two-year registration period, and every year thereafter, a Registrar will send an invoice to re-register the domain name. Therefore the date of the first domain name to ever become newly available to the public due to failure to pay a renewal fee was in September 1997. However, co-pending patent application Ser. No. 08/900,437 filed Jul. 25, 1997 states that delivery and updating methods are applicable to the renewed availability of domain name related information solving a need two months before the need became evident.

Domain name registration for a given NIC authority can be accessed by a TCP/IP application called WHOIS, which queries a NIC database to find the registration date, the name of network and system administrators, system and network points-of-contact, and other individuals who are registered in appropriate databases. Domain names are identifiers used for both accessing a resource and retrieving contact information of the registrant or domain name holder of that resource. The availability of a domain name from a NIC authority for a given TLD is determined by submitting a WHOIS request. If there are no matches in the database then the domain name is available for registration. Because the WHOIS database is centralized rather than distributed, the DNS supports only resolution services rather than directory or registration services. Resource location is determined by resolving a query in the DNS and domain name availability is determined by using a WHOIS service to query an appropriate NIC database.

WHOIS database is a centralized sole-source of data collected by NSI under government contract. Though the WHOIS database is a collection of facts and therefore can not be copyrighted. NSI has been claiming WHOIS database ownership based on the labor of collection/compilation of "customer data". On Sep. 29, 1999 an on-line Wired News article reports that "parties charged with overseeing the Internet's DNS have reached a truce that extends NSI domain database ownership, albeit with significant concessions. NSI emerged with continued jurisdiction over WHOIS, the mother of all Internet databases, which lists all .com, .net and .org domain information: The agreement also extended NSI's dominion over WHOIS for an additional four years." On Jan. 21, 1999 an on-line CNET News article reports, "Since the beginning of the year, an unprecedented number of people have been flooding NSI with requests for popular domain names that are on hold. These so-called speculators hope that by automatically requesting a popular site every few seconds, there is a better chance of obtaining it once it opens", also quoted in the article from a NSI spokesperson, "There does not seem to be any reason why third parties need to know the anniversary date or status of domain names for which they have no association and, if they do feel they need this information, they could contact the registrant to request this information". On Jan. 19, 1999 another on-line CNET News article reports, "In an apparent attempt to combat the speculators, NSI today stopped disclosing in its WHOIS database whether domain names are on hold or when the address was originally registered. NSI deems a site on hold when it has been suspended for any number of reasons, such as nonpayment of fees. The information—which, until today, had been a part of the database for years—makes it easier for people to guess when a popular site that is on hold—for example e-shopping.com—will become available".

It is apparent from these news articles that there is an ongoing struggle for control and ownership of the WHOIS database. Tactics have been used to suppress the domain name registration date from the results of a WHOIS query or control the distribution of the TLD zone files, which is critically relied on by all devices connected to the Internet for the purpose of name resolution. Certainly, at a minimum the domain name and registration date, is not "customer data" and is considered fact that the public should have access to. These measures are an attempt to inhibit the public from re-registering domain names that are newly available and fall back into the public domain.

This analogy can be extended to the field of telephone numbers. When a subscriber or provider terminates service of a telephone number, the telephone number is held ninety days for residents and one year for businesses before released and made available to other subscribers. During this pending time, a subscriber may renew service so it is unclear as to what telephone numbers are inevitably available on the given telephone number release date. Telephone number availability has remained to this day transparent and unquestioned by the public. It is the public's right to know both what is and what is not available property in order to make an informed decision. As previously discussed in co-pending patent application Ser. No. 08/900,437 filed Jul. 25, 1997 now U.S Pat. No. 5,987,464 use is made from the knowledge of what patent maintenance fees are paid in advance. Further applications of using information before it is known what information is newly available will be further discussed in this present invention.

The conditions of centralization first mentioned have allowed for industry to overlook novel solutions for the dissemination of newly available information. Accordingly, in light of the above, there is a strong need in the art for a novel system and method for updating information/ reference files of a computer and/or computer system without putting the onus of updating on the subscriber so that an information program stored thereon is kept current. Moreover, there is a strong need to improve a system and method to optimize the search, retrieval, reporting, delivery, and update of master database information and newly available information for both on-line/off-line and centralized/ distributed systems.

SUMMARY OF THE INVENTION

The present invention in particular relates to a system and method for updating patent files of a computer and/or computer system so that the patent files include newly issued patents and premature expired ones. However, as discussed below, the present invention has applicability to updating a variety of types of reference data files of a computer and/or computer system without putting the onus of updating on the subscriber.

Briefly, the present invention provides a portable storage media such as a floppy disk, CD-ROM or DVD-ROM that is being used to install a program, reference. data files or other data to a computer or computer system. At subsequent intervals, new issue data, news and advertising data, renewal and reinstatement data, and control/reference data are also provided to the computer or computer system. The control/ reference data being downloaded is a representation of the most recently available data references. The computer or computer system receiving the files creates a subset of reference data files to be queried, browsed, searched, selected, reported, archived, ordered, or hyperlinked. Thus, according to the present invention, a computer system's information reference data files are automatically updated and indexed with the installation of new data and/or programs.

There are many types of information delivery programs that the present invention will benefit. For example, there are newly issued and premature expired patent and trademark providing programs, and job and housing availability programs to name a few. The aforementioned updating problem is prevalent in all areas where particular software utilizes reference files that need to be updated frequently in order for the system using the software to operate optimally. As mentioned above, the present invention can be utilized to update any suitable reference files of a computer and/or computer system without putting the onus of updating on the user.

The present invention optimizes the on-line transmission size of time sensitive-information to a subscriber. The invention utilizes renewal information and previous expiration information to increase the subscription period. The present invention minimizes the use of using portable storage media by buffering or caching data to be used in the near future. The invention offers an automated clipping service to encourage the potential use and easier access of information to the public.

The present invention offers an automated preview service that utilizes the time delay between receiving control/reference data for building newly available information and receiving newly issued information. The invention reduces the search and retrieval time for accessing master database information and newly available information. The present invention also implements methods of verification to assure the accuracy and reliability of newly available information. The invention streamlines the document delivery process by accessing document images off-line. The invention maintains privacy of a subscriber's query off-line and when possible limits on-line to retrieval only, of for querying non-semantic or keyword search strategies, such as but not limited to classification and cross-reference searching.

The present invention uses Service Providers (SPs) for tiered subscribing to act as a proxy on behalf of their clients (other subscribers) allowing for less distribution costs, reduced network bandwidth from data queries and updates, and privacy to the end user when querying and accessing data while the invention remains ubiquitous but yet transparent to the end-user. The invention allows for small portions or recursively smaller portions of large databases (compiled or distributed) to be updated by sending both a query and encoded bit mask for determining a query subset that is compiled and constitutes new use.

According to one particular aspect of the present invention, a method for creating data files of a computer system is provided including the steps of: storing first data on a storage medium of the computer system, the first data including an executable program and data files; subsequently storing second data on the storage medium of the computer system; and using the second data to create third data on the storage medium, wherein the third data is an updated subset of the data files.

According to yet another aspect of the present invention, a computer system is provided including: at least one computer; and a storage medium coupleable to the at least one computer, the storage medium adapted to deliver data to the at least one computer, the storage medium including first and second data; wherein the first data includes an executable program and data files, the second data is used to create third data on the storage medium, the third data being an updated subset of the data files.

In accordance with yet another aspect of the invention, a method for creating data files of a computer system is provided including the steps of: storing first data on a storage medium of the computer system, the first data including an executable program and data files, the data files including potentially reusable data; subsequently storing second data on the storage medium of the computer system, the second data including data that corresponds to a subset of records of the data files; and executing the program for combining the second data with the data files to create third data on the storage medium, the third data including newly indexed available information, wherein the third data is an updated subset of the data files.

The aforementioned program can be executed to combine the data from both deliveries and build newly indexed data files in storage. The new data is then sent to the display of the computer system and through the use of a computer user interface, the subscriber can configure, query, browse, select, report, archive, order, or hyperlink from the search engine. If so desired, the subscriber can connect to the Internet or other on-line services via the transceiver of the computer system to view a selected document image and send order or other information to the provider. The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

Brief Description of the Drawings

FIG. 7b is a lookup table used to determine if a patent number is within an expected range of patent numbers in accordance with the present invention;

FIG. 10a is a table showing the projected delivery size of the control data in accordance with the present invention;

Detailed Description of the Invention

Figure 1:
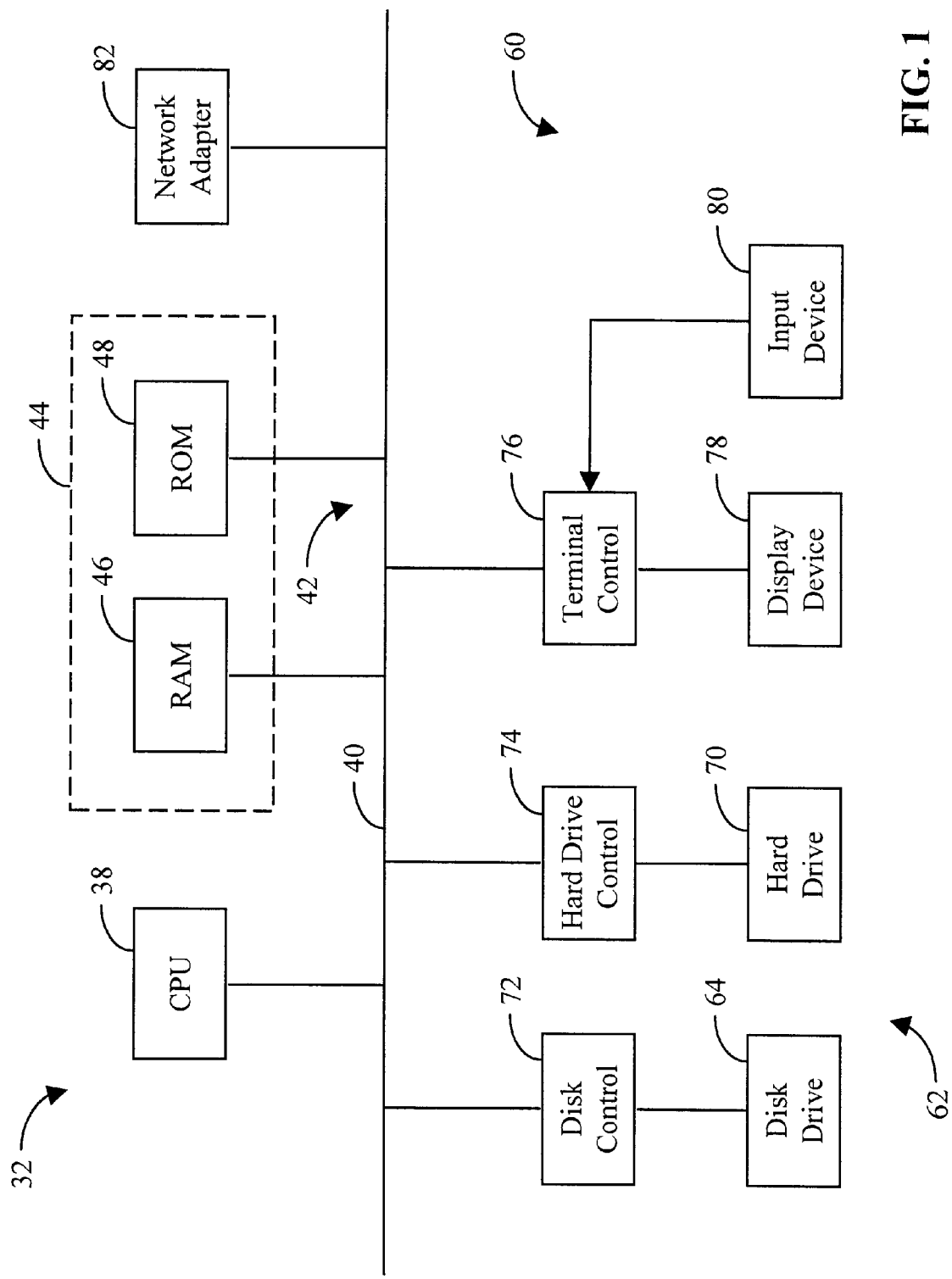
FIG. 1 is a block diagram of a computer system in accordance with the present invention.

The present invention will now be described with reference to the drawings, wherein like reference numerals are used to refer to like elements throughout.

Turning first to the nomenclature of the specification, the detailed description which follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

The processes and operations performed by the computer include the manipulation of data bits by a local processing unit or remote server and the maintenance of these bits within data structures resident in one or more of the local or remote memory storage devices. These data structures impose a physical organization upon the collection of data bits stored within a memory storage device and represent specific electrical or magnetic elements. Symbolic representations are the means used by those skilled in the art of computer programming and computer construction to most effectively convey teachings and discoveries to others skilled in the art.

For the purposes of this discussion, a process is generally defined as being a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, pixel Values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general purpose digital computers or other similar computing devices.

In addition, it should be understood that the programs, processes, method, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

As is mentioned above, the present invention relates to a system and method for creating and updating data files and references 30 of a computer and/or system 32 so that an information providing program 34 stored thereon will include the newest information available. The present invention provides a set of reference data files 30 on a recording medium 36 such as a floppy disk, CD-ROM, DVD-ROM or any portable storage media (including rewritable media) that is being used to install the program 34, files or other data to a computer 32 or computer system 32. Of course the computer system can receive the program, files, and other data by downloading such information via a transceiver such as a modem or other device that can establish a network connection. Along with the program 34 or data being installed, the updated reference data files 30 are also provided to the computer 32 or computer system 32. The reference data files 30 being downloaded include the most recently available data references. The computer 32 or computer system 32 receiving the files creates a subset of reference data files 30 to be configured, queried, browsed, selected, reported, archived, ordered, or hyperlinked. Thus, according to. the present invention, the computer system's 32 information reference data files 30 are automatically updated with the installation of new data and/or programs.

Referring initially to FIG. 1, a detailed block diagram of the computer system 32 is shown in accordance with the present invention. The computer system 32 includes a central processing unit (CPU) 38, which is coupled to a bus 40. The CPU 38 or processor can be any of a plurality of processors, such as a Pentium II and other similar and compatible processors. The processor 38 functions to perform various operations described herein as well as for carrying out other operations related to the system. The manner in which the processor can be programmed to carry out the functions relating to the present invention will be readily apparent to those having ordinary skill in the art based on the description provided herein.

The bus 40 includes a plurality of signal lines 42 for conveying addresses, data and controls between the CPU 38 and a number of other system bus 40 components. The other system bus 40 components include a memory 44 (including a Random Access Memory (RAM) 46 and a Read Only Memory (ROM) 48) and a plurality of Input/Output (I/O) devices 60. The memory 44 serves as data storage and may store appropriate operating code to be executed by the processor for carrying out the functions described herein.

The RAM 46 provides program instruction storage and working memory for the CPU 38. The ROM 48 contains software instructions known as the Basic Input/Output System (BIOS) for performing interface operations with the I/O devices 60. Also stored in the ROM 48 is a software routine, which operates to load a boot program from the booting device. The boot program will typically be executed when the computer system 32 is powered on or when initialization of the system 32 is needed.

The I/O devices 60 include basic devices such as data storage devices 62 (e.g., floppy disks 64, tape drives, CD-ROMs, hard disks 70, etc.). Typically, the I/O devices 60 communicate with the CPU 38 by generating interrupts. The CPU 38 distinguishes interrupts from among the I/O devices 60 through individual interrupt codes assigned thereto. Responses of the CPU 38 to the I/O device 60 interrupts differ, depending, among other things, on the devices generating the interrupts. Interrupt vectors are provided to direct the CPU 38 to different interrupt handling routines.

The interrupt vectors are generated during initialization (i.e., boot up) of the computer system 32 by execution of the BIOS. Because responses of the CPU 38 to device interrupts may need to be changed from time to time, the interrupt vectors may need to be modified from time to time in order to direct the CPU 38 to different interrupt handling routines. To allow for modification of the interrupt vectors, they are stored in the RAM 46 during operation of the computer system 32.

A disk control subsystem 72 bidirectionally couples one or more disk drives (e.g., floppy disk drives, CD-ROM drives, etc.) to the system bus 40. The disk drive works in conjunction with a removable storage medium 62 such as a floppy diskette 64 or CD-ROM.

A hard drive control subsystem 74 bidirectionally couples a rotating fixed disk, or hard drive 70 to the system bus 40. The hard drive control subsystem 74 and hard drive 70 provide mass storage 62 for CPU 38 instructions and data.

A terminal control subsystem 76 is also coupled to the bus 40 and provides output to a display device 78, typically a CRT monitor and receives inputs from a manual 80 device such as a keyboard. Manual input may also be provided from a pointing device such as a mouse. A network adapter 82 is provided for coupling the system to a network.

The components illustrated in FIG. 1 may be embodied in a personal computer, a portable computer, a workstation, a minicomputer, a main frame computer, or a super computer. As such, the details of the physical aspect of the data processing system such as structure of the bus 40 or the number of CPUs 38 that are coupled to the bus 40, is not crucial to the operation of the invention and thus is not described in further detail below.

Figure 2A:
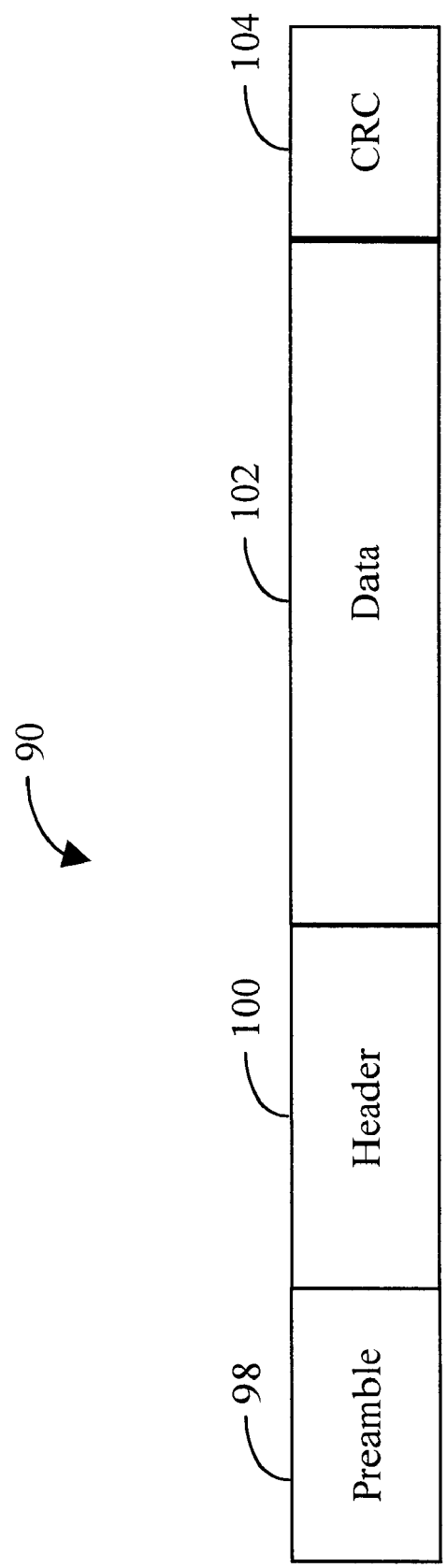
FIG. 2a is a schematic representation of a packet format in accordance with the present invention.

FIG. 2*a* shows the format of an exemplary data packet 90 received by the transceiver 92 (FIG. 4). In order to ensure proper routing of messages between the information provider 94 and an intended receiver 96, the messages are initially broken up into data packets 90, each of which receive a destination address according to a consistent protocol, and which are reassembled upon receipt by the target computer 32. The exchange of information between endpoints in a packet network is achieved via a "protocol." A commonly accepted protocol for this purpose is the Internet Protocol (IP), which provides for networking. Used in conjunction with the IP may be a Transmission Control Protocol (TCP) which provides for a reliable stream delivery of messages or a User Datagram Protocol (UDP) which allows for distinguishing messages among multiple destinations with a given host computer 32.

More specifically, the TCP protocol is a popular connection-oriented transport layer protocol that is used around the world. The TCP protocol offers a full duplex reliable virtual end-to-end connection for transporting information between endpoints by using one or more of the packets 90, each of which comprises both control information and data.

As is conventional, the data packet 90 is represented by a sequence of data and/or control information which is segmented into respective fields. The data packet 90 together with the information contained therein is constructed by the device which subsequently transmits the packet 90 to the transceiver 92. The format of the data packet 90 will typically be governed by the system protocol as is conventional. The data packet 90 includes, in order, a synchronization field 98 (i.e., preamble) including synchronizing bits for synchronizing the receiver; a header field 100 including header information such as the source address of the data packet 90, the header field 100 including at the end thereof a length field including information regarding the length of the packet 90 (e.g., number of bits); a type/address field; a data field 102; and a cyclic redundancy check (CRC) field 104. It is noted that the length of the respective fields as shown in FIG. 2 as well as the other figures herein is not necessarily shown in proper corresponding proportion. In many cases the length of some fields has been exaggerated in the drawings for ease of understanding. Furthermore, it is also noted that the synchronization field may be transmitted at a data rate different from that of the remaining packet 90, as is well known throughout the art.

The type/address field includes the destination address of the packet 90 and information indicating whether or not the packet 90 is of a type, which requires a response. For example, the type/address field can include one or more bits which are set to indicate that the transceiver 92 is required to transmit a positive and/or negative acknowledgment of receipt of the packet 90. In addition, or in the alternative, the type/address field can include information, which identifies the packet 90 as a type which needs to be processed and transmitted by the transceiver 92 in order to forward the information to another location. Regardless of the particular reason why the packet 90 may necessitate a response, the type/address field has one or more predetermined indicia therein for indicating whether the packet 90 is of a type which requires that the transceiver 92 respond by transmitting information or is of a type which does not require that the transceiver 92 respond by transmitting information. The type/address field is shown located approximately in the middle of the data packet 90, although it will be appreciated that the type/address field could be located elsewhere in the packet 90. In the preferred aspect, however, the type/address field is located within the initial half of the data packet 90 and most preferably towards the front of the packet 90.

Following the type/address field, the data packet 90 includes a data field 102 which contains the primary data being sent within the packet 90. The data field 102 is then followed by a cyclic redundancy check (CRC) field 104 which includes a CRC code for error detection as is conventional.

Figure 2B:
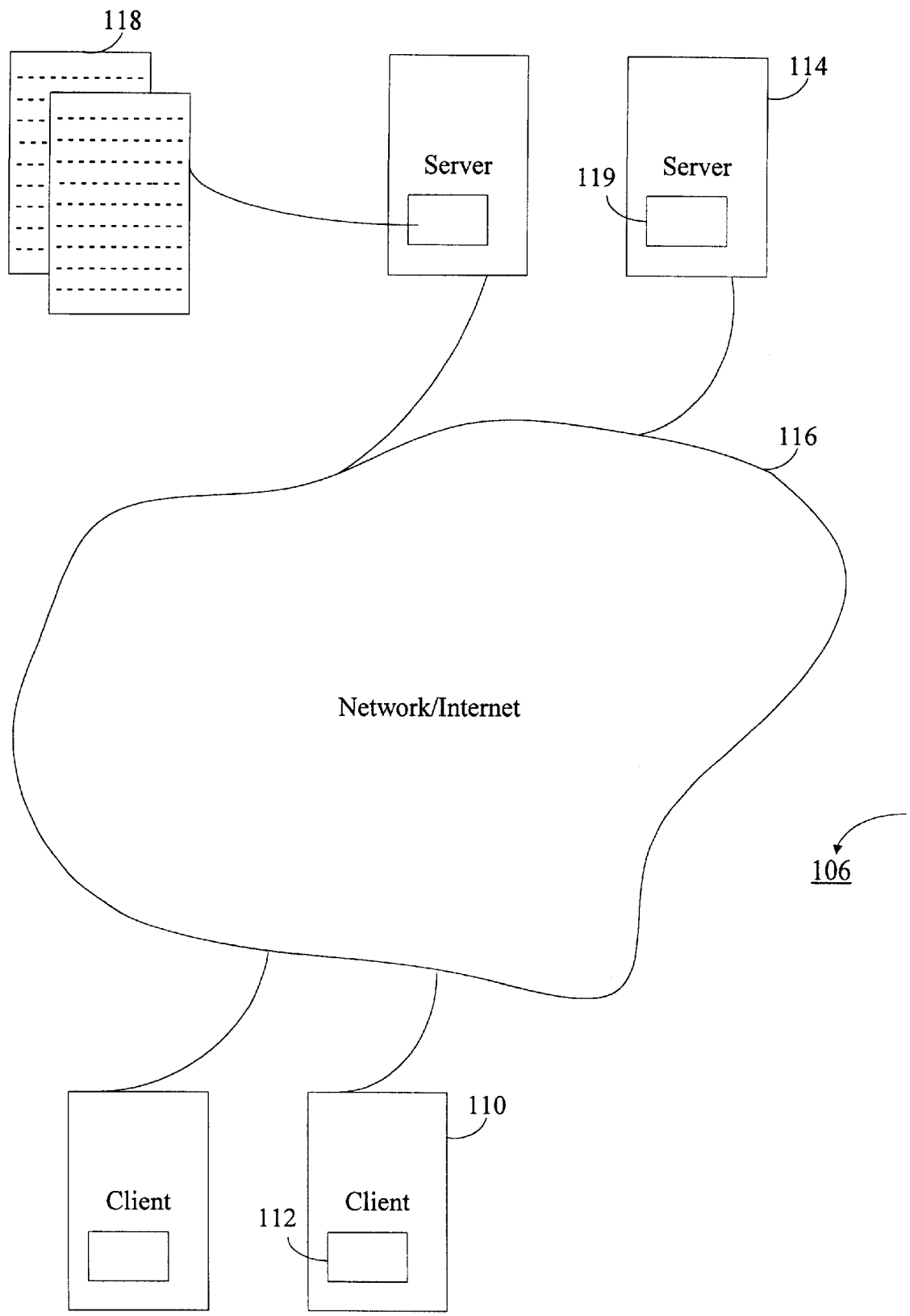
FIG. 2b is an illustration of a distributed computer system in accordance with the present invention.

FIG. 2b is a block diagram illustrating a distributed computer system 106. The distributed system 106 includes client computers or any network access apparatus 110 connected to server computers 114 via a network 116. The network 116 can use Internet communications protocols (IP) to allow the clients 110 to communicate with the servers 114. The network access apparatus 110 further includes a modem or like transceiver 92 to communicate with the electronic network 116. The modem 92 can communicate with the electronic network 116 via a line such as a telephone line, POTS, PBX, Centrex, an ISDN line, a coaxial line, a cable television line, a fiber optic line, xDSL modem, a cable-modem, or a computer network line. Alternatively, the modem 92 can wirelessly communicate with the electronic network 116. The electronic network 116 can be provided by an on-line service, an Internet service provider, a local area network (LAN) service, a wide area network (WAN) service, a cable television service, a wireless data service, an intranet, extranet, a satellite service, or the like.

The client computers 110 can be any network access apparatus including hand held devices, palmtop computers, personal digital assistants (PDAs), notebook, laptop, portable computers, desktop PCs, workstations, or larger or smaller computer systems. It is noted that the network access apparatus can have a variety of forms, including but not limited to, a general purpose computer, a network computer, a network television, an internet television, a set top box, a web-enabled telephone, an internet appliance, a portable wireless device, a television receiver, a game player, a video recorder, or an audio component.

Each client 110 typically includes one or more processors, memories, and input/output devices. An input device can be any suitable device for the user to provide input to a client computer 110; for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, or cable box. A data glove, an eye tracking device, or any MIDI device could also be used. A display device could be any suitable output device, such as a display screen, text-to-speech converter, printer, plotter, fax, television set or audio player. Although the input device is typically separate from the display device, they could be combined; for example: a display with an integrated touchscreen, a display with an integrated keyboard, or a speech-recognition unit combined with a text-to-speech converter.

The servers 114 can be similarly configured. However, in many instances server sites 114 include many computers, perhaps connected by a separate private network. In fact, the network 116 may include hundreds of thousands of individual networks of computers. Although the client computers 110 are shown separate from the server computers 114, it should be understood that a single computer can perform the client and server roles.

During operation of the distributed system 106, users of the clients 110 desire to access information records 119 stored by the servers 114 using, for example, the World-Wide-Web (WWW), or in short the "Web." The records of information 119 can be in the form of Web pages 118. The pages 118 can be data records including as content plain textual information, or more complex digitally encoded multimedia content, such as software programs, graphics, audio signals, videos, and so forth. It should be understood that although this description focuses on locating information on the World-Wide-Web, the system can also be used for locating information via other wide or local area networks (WANs and LANs), or information stored in a single computer using other communications protocols.

The clients 110 can execute Web browser programs 112, such as Netscape Navigator or MS Internet Explorer to locate the pages or records 118. The browser programs 112 allow the users to enter addresses of specific Web pages 118 to be retrieved. Typically, the address of a Web page is specified as a Uniform Resource Identifier (URI) or more specifically as a Uniform Resource Locator (URL). In addition, once a page has been retrieved, the browser programs 112 can provide access to other pages or records by "clicking" on hyperlinks to previously retrieved Web pages. Such hyperlinks provide an automated way to enter the URL of another page, and to retrieve that page.

Figure 3:
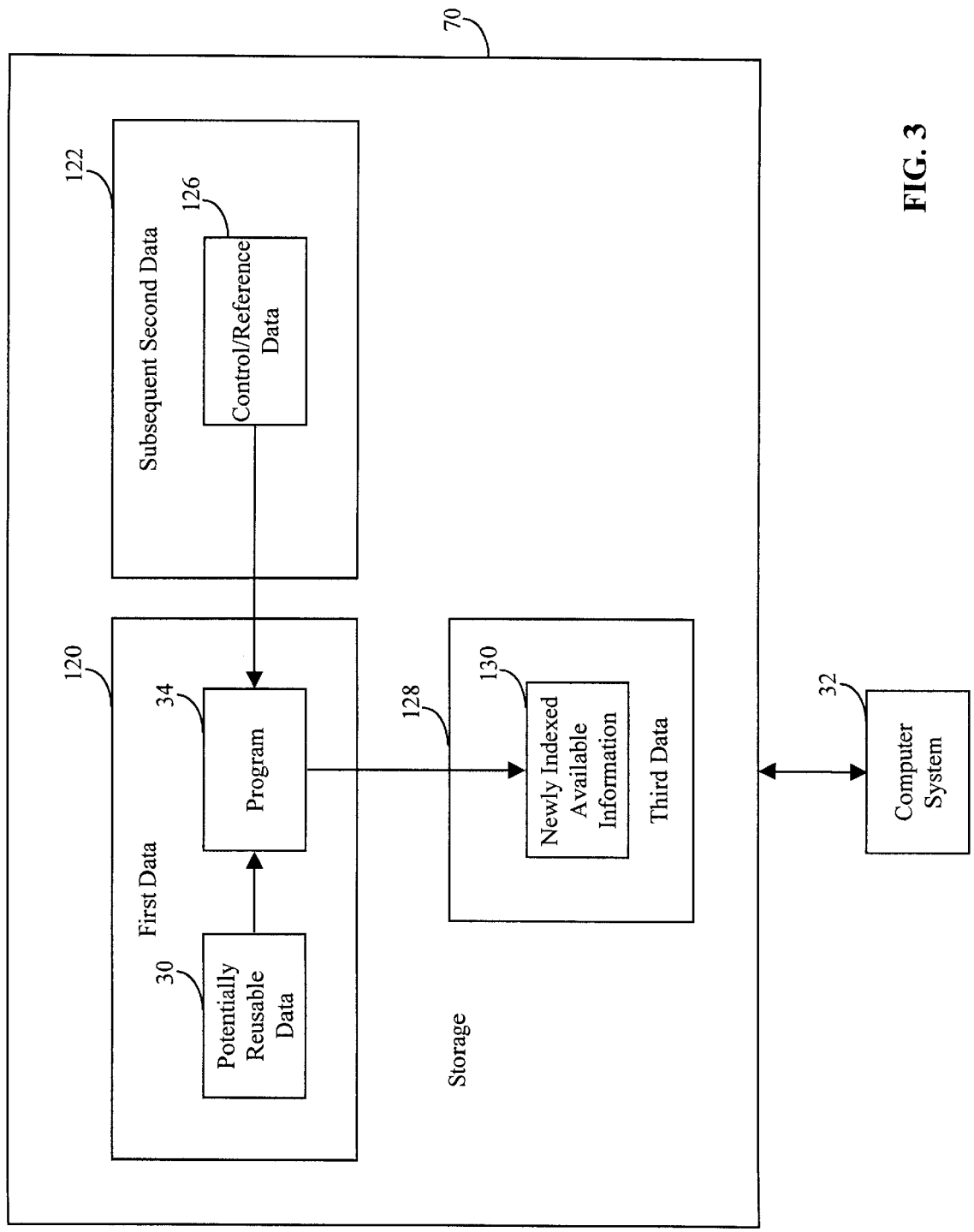
FIG. 3 is a block diagram showing the relationships of the storage of first, second, and third data on a computer system in accordance with the present invention.

Referring now to FIG. 3, a first data 120 including the program 34 and potentially reusable data 30 is stored on a storage medium 70 of the computer system 32. In turn, a second data 122 including control/reference data 126 is subsequently and/or periodically made accessible to the computer system 32. Most typically, the second data is stored on the same storage medium 70 as the first data 120. The contents of the control/reference data 126 may or may not be known at the time that the first data 120 was stored. The control/reference data 126 corresponds to a subset of the potentially reusable data 30. The program 34 is executed to either receive or download the second data or executed in response to receiving or downloading the second data. The executed program combines the control/reference data 126 and the potentially reusable data 30 to create third data 128 including newly available information 130 on the storage medium 70 of the computer system 32 or on any storage medium either coupled or accessible to the computer system 32. The newly available information can then be further indexed, searched, and filtered accordingly by the program as will be further discussed.

FIG. 3 also illustrates network based updating in addition to the delivery of a computer readable medium such as a portable storage media as discussed above. A storage facility 70 with an executable computer program 34 and a data file having potentially reusable data 30 stored therein and at least one communication link 92 connecting the provider computer system 94 and the subscriber computer system 96 periodically receives, from the provider computer system 94, data including control/reference data corresponding to at least one record of the potentially reusable data. The control/reference data indicates whether the received data is to be maintained in a subset of the records of the at least one data file. The computer program is either executed to receive the control/reference data and/or automatically executes in response to the control/reference data on the subscriber computer system to combine the control/reference data with the potentially reusable data to create data of new use that is an updated subset of the potentially reusable data, wherein the new data includes at least one data file of newly issued information having at least one issue date and at least one expiry date.

Information updates generally rely upon "new" information that is revealed for the first time. Future events are generally not precisely known if at all. When a news story breaks, "new" information is revealed as facts are discovered while the story unfolds or develops. However as shown in the present invention, an information update can rely on the new use of old or previous information only. The present invention teaches how "new" information is derived under certain conditions from a subset of "old" information yielding new use that benefits the subscriber by having concrete and useful results.

Figure 4A:
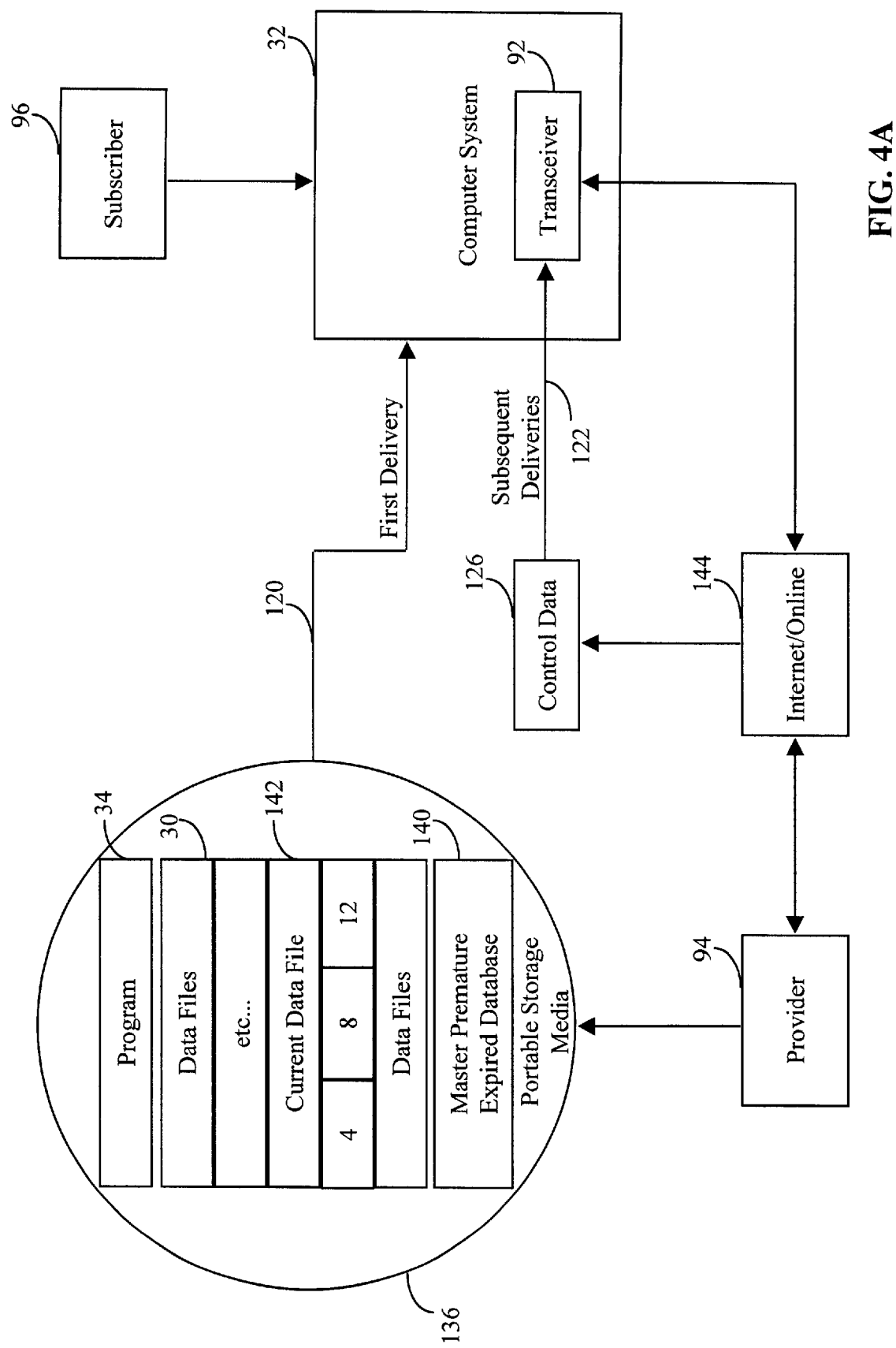
FIG. 4a is a block diagram of a computer system and method of delivery for a given subscription period in accordance with the present invention.

Turning now to a more detailed consideration of a preferred aspect of the present invention, FIG. 4a illustrates a first delivery of data 120 which is sent to a subscriber 96 from a provider 94 via the portable storage media 136, or received by a subscriber via other forms of transmission. The delivery includes the following: a master premature expired patent database 140, a program 34 that allows a subscriber 96 to configure, query, browse, select, report, archive, order, or hyperlink from the master premature expired patent database 140 or from future databases that can be remotely built by the program 34, and data files 30 of patent information that have the potential to prematurely expire after four, eight, or twelve years from the issue date of the patent. Subsequent deliveries 122 of control data 126 are periodically sent to the subscriber 96 via e-mail or periodically received/downloaded by a subscriber/client device via any network transfer protocol such as File Transfer Protocol (FTP) or from other forms of transmission (e.g. a set-top-box (STB) receives control/reference data from the Vertical Blanking Interval (VBI) of a television broadcast) where the content of such data is either known/unknown at the time of the first delivery. The control data 126 represents information that corresponds to a subset of records from the current data file 142.

At this point, the subscriber 96 can operate the computer system 32 and execute the program 34 to either combine a current data file 142 with the control data 126 or to configure, query, browse, select, report, archive, order, or hyperlink from the master premature expired database 140 and connect to a network such as the Internet 144 or other on-line services via the transceiver 92 of the computer system 32 to view a selected document image and send order or other information to the provider 94. The first 120 and subsequent deliveries 122 of FIG. 4a represent information sent during a given subscription period. A subscription period is the time it takes to send a new first delivery 120 of information. For instance, if a portable storage media 136 is updated and sent quarterly, the subscription period is three months. More than three months of data files 30 of patent information that have the potential to prematurely expire are placed on the portable storage media 136 so there is no lapse in coverage for creating indexed databases of newly available information 130 while the portable storage media 136 for the next subscription period is being sent.

Though FIG. 4a illustrates how both a master database and potentially reusable data are sent on the same portable storage media. A computer readable medium such as a portable storage medium can also be configured to store the master database only or potentially reusable data only as a means to separate original or master files from that of update reference data files. Storing the update files separately, allows for more storage dedicated to updating, thereby further increasing the subscription period of the portable storage media. It is also noted that such storage media is not limited to read-only technology and is applicable to read/writable portable storage media as well including magneto-optical, Write Once Read Many (WORM), and Write Many Read Many (WMRM), etc.

The current data file includes the expiration date as part of the filename, which also matches the filename of the control/reference data file having the same expiration date as part of the filename. To minimize the periodic use of the portable storage media it is preferred that the subscriber use a CD-ROM or DVD-ROM jukebox to virtually eliminate the constant inserting/ejecting of the media which can lead to wear and tear and potentially affect the operation of the computer readable medium. However, when a subscriber only has one available media reader then advantage can be taken of buffering or caching many files in advance by storing several weeks or months of soon to be potentially reusable data files on a storage medium accessible to the subscriber computer system. The program allows a subscriber to configure (not shown) minimum and maximum buffer levels of pre-loading potentially reusable data from the portable storage media. After levels are configured, the program transfers the necessary data to the hard drive and prompts the subscriber in the future whenever the buffering threshold has been exceeded thereby decreasing the frequency of periodic usage of the portable storage media by the subscriber. In effect both the use of the portable storage media and the selection and arrangement of potentially reusable data can be viewed as functionally equivalent to a long-term cache. Each data file that is partitioned by expiration date can, in turn, be viewed as a separate cache.

Conventionally, a cache is used to speed data access by ranking data on criteria such as frequency of use, last use, time-to-live (TTL) or expiration period etc. When it is determined new data is to be cached while the cache is full, the new data is appended and data that has expired, seldom been accessed, or not accessed within a given duration is deleted. The long-term cache of the present invention, however, functions in a reverse model by placing priority on data that has remained in the cache longer. Data is arranged by TTL, expiration date, or renewal date and more priority is placed on data as the TTL, expiration, or renewal date approaches. The present invention is applicable to caching wherein at subsequent intervals a compiled subset of a cache takes upon new use independent from the use of the original cache.

Figure 4B:
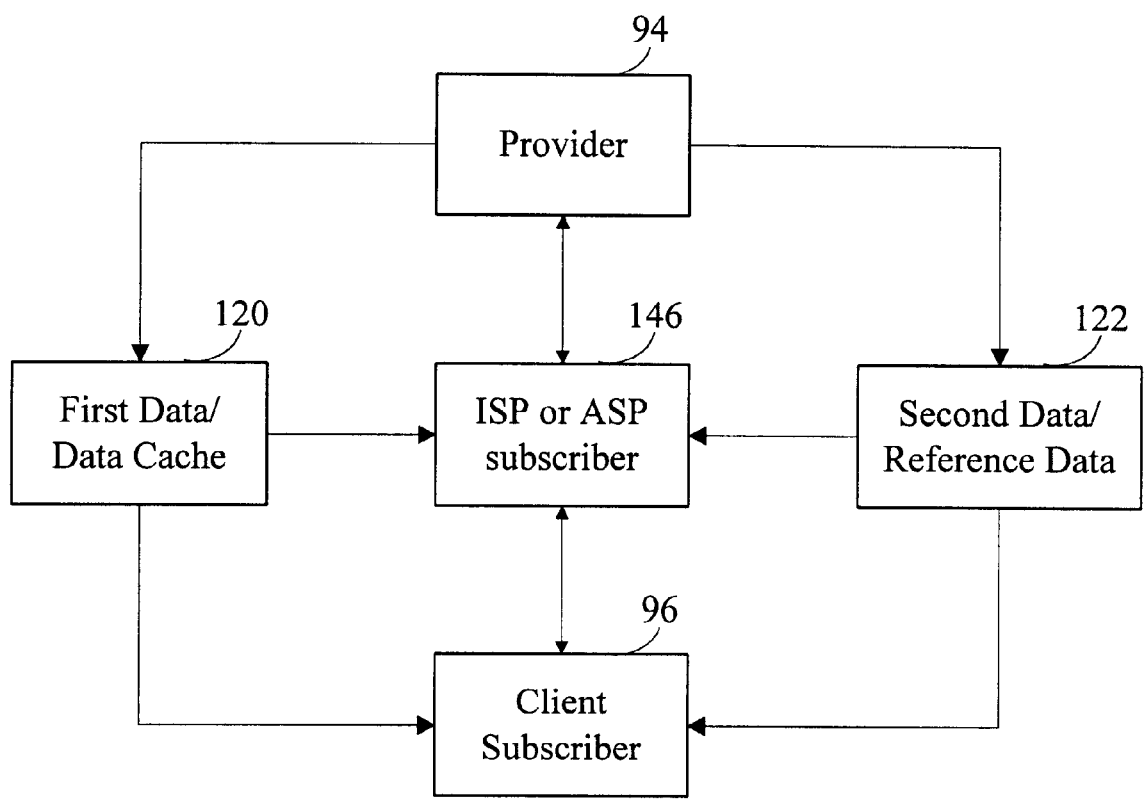
FIG. 4b is a block diagram of delivering first and second data to an ISP/ASP subscriber in accordance with the present invention.

Tiered subscribing is used by the invention by having subscribers such as Internet Service Providers (ISPs) or Application Service Providers (ASPs) act as a proxy on behalf of their clients (other subscribers) by installing a computer readable medium having a long term cache which receives provider updates. The ISP or ASP can centralize jukebox servers, which is used to shift the burden from client subscribers managing portable storage media. By distributing updates to the ISP or any intermediary, advantages such as less distribution costs, reduced network bandwidth from data queries and updates, and privacy to the end user when querying and accessing data are realized while such a system remains ubiquitous yet transparent to the end-user. Tiered subscribing can be further applied and extended to content-on-demand, web caching, and streaming media applications to name a few. FIG. 4b illustrates the relationships between the provider 94, client subscriber 96, ISP/ASP subscriber 146, and the delivery of first 120 and second data 122. For instance, the first data 120 represents a long term data cache of information that becomes useful when expired whereas second data 122 includes reference data used to select the specific updated subset of expiring information from the data cache.

Figure 4C:
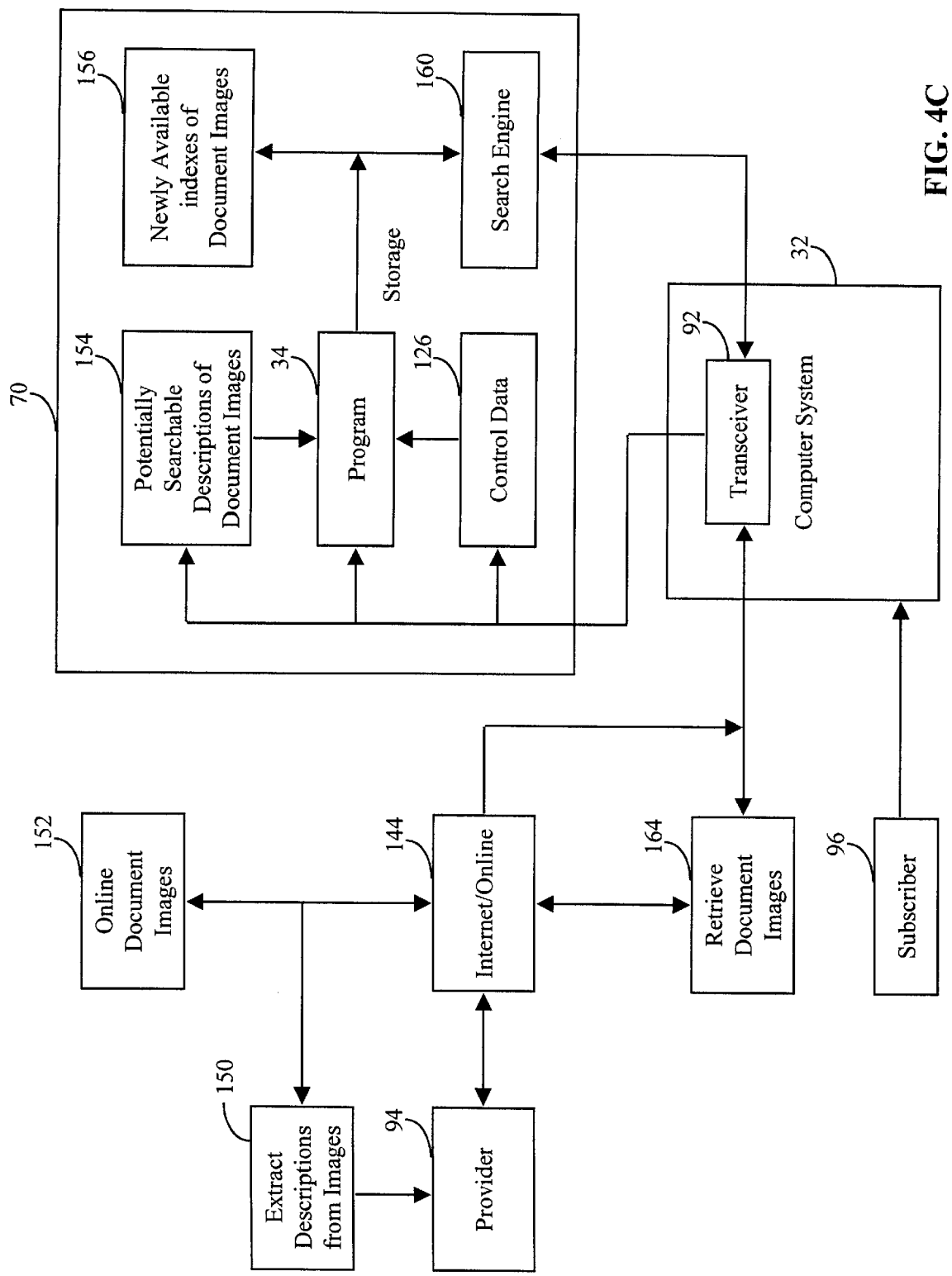
FIG. 4c is a flowchart showing how on-line document images can be searched and retrieved in accordance with the present invention.

Turning now to FIG. 4c, a flowchart shows how off-line indexes are created to be used for retrieving on-line document images. A provider 94 extracts text descriptions 150 of on-line document images 152 from the Internet 144 to be prepared for delivery. A first delivery 120 is sent to the storage 70 of a subscriber's 96 computer system 32 via the transceiver 92 which includes a program 34 and data files of potentially searchable descriptions of document images 154. The program 34 receives via the transceiver 92 a subsequent delivery 122 of control data 126 which combines with the potentially searchable descriptions 154 to form indexes 156 of the location information of the on-line document images 152 and indexes 156 of the searchable descriptions 154 of the document images 152. The subscriber 96 uses the search engine 160 from the program 34 to search and select for desirable document descriptions 154. To retrieve an on-line document 152, a subscriber 96 uses the search engine 160 to use the indexes of document location information 156 and retrieve document images 164 from the Internet 144 via the transceiver 92 of the computer system 32.

Each on-line document image is stored as a unique Uniform Resource Identifier (URI) or more specifically as a unique Uniform Resource Locator (URL). In addition, extracted full-text of a document image is also stored as a unique URL which serves as a means for any client computer connected to a public network such as the Internet to globally access a specific on-line resource from any other computer system (provider or subscriber) worldwide.

Potentially reusable data is applicable to a given set of URLs wherein at a subsequent time the compiled subset from the set of URLs take upon new use independent from the original set of URLs. A compilation of URLs represents an index of a distributed database. As shown in the present invention, there are cases where the compilation of a subset from the database (distributed or not) constitutes a new use having independent utility from the superset of information from which it was derived. In turn, the compilation of a subset of URLs also constitutes a new use as of such wherein keyword indexing is generated from the accessed content of the URLs as a means for efficiently searching and retrieving the newly issued and/or compiled URL subset. In addition, the original set of URLs can be compiled and cached by sending such information to licensed service providers for use in tiered subscribing applications.

Figure 5:
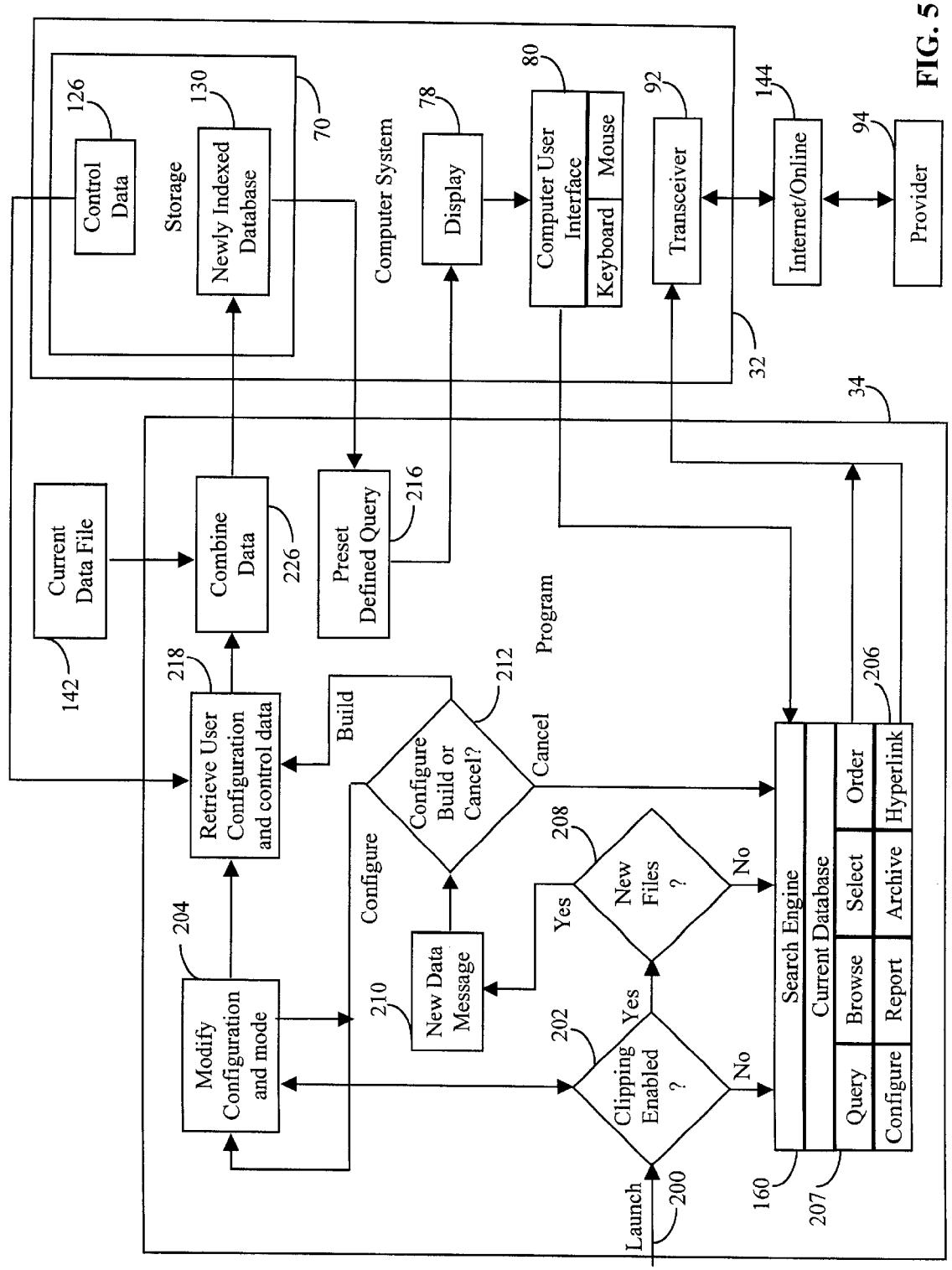
FIG. 5 is a system flow chart of the program, new data formation and usage illustrating one particular aspect of the present invention.

Turning now to FIG. 5, a flowchart that represents the general operations of the present invention and the relationship between the subscriber 96, the executable program 34 and the computer system 32. Set out below is an illustration of the update program 34 for applying modifications or updates to the reference data files 30 of the system 32. The update program 34 is in program design language from which source code and machine code are derivable. In the following general description of the update program 34, it is to be assumed that system is under mouse and keyboard device control. Moreover, it is assumed that the update program 34 is invoked from a driver program contained in the operating system which facilitates the display of all of the screen panels, the monitoring of the keyboard and the installation of the plurality of separately installable features or components of the software program.

When the subscriber 96 launches 200 the program 34, the status of the automated clipping service 202 is determined by retrieving configuration 204 information to determine if the clipping mode is enabled 202 and if the clipping mode 204 is automated. If the clipping mode is disabled, the program 34 enters the search engine 160 allowing the subscriber 96 to configure, query, browse, select, report, archive, order, or hyperlink 206 from the current database 207. When the clipping mode 202 is enabled and there are no control files available 208, the program 34 enters the search engine 160. However, when there are new control files expected to be available 208 or there are old control files available 208, a message 210 is displayed stating that newly available information 130 is waiting to be built. Along with this message 210, there are three choices 212 for the subscriber 96 to select from. The first choice 212 allows the subscriber 96 to configure two parameters 204 in order to automate the clipping service 202. These parameters are the default data path to find the most recent control data 126 available, and the filename and data path to find the provider/subscriber preset defined query 216 that filters the newly available information to be built. Each data path can be of course further be represented by a URl. The second choice 212 allows the subscriber 96 to cancel the message 212. By doing so, the program 34 enters the search engine 160. The third choice 212 allows the subscriber 96 to build and view the newly available information 130. When this selection is made, the user configuration 204 information is retrieved 218 and the program 34 combines 226.the new control data 126 with the corresponding current file 142 of potentially reusable data 30 and builds an indexed database of newly available information 130 in storage 70. The program 34 then filters the newly created indexed database 130 with a user-defined preset query 216 and sends the information of interest to be displayed 78. If the clipping mode 204 is automated, then the above choices and messages are bypassed, and subscriber 96 preferences are retrieved from configuration 204 to determine what new information is filtered 216 or automatically clipped and sent to the display 78.

From this point, the subscriber 96 can operate a computer user interface 80 (e.g. through an input device such as a keyboard, mouse, etc.) to configure, query, browse, select, report, archive, order, or hyperlink 206 from the search engine 160 and connect to the Internet 144 or other on-line services via the transceiver 92 of the computer system 32 to view a selected document image and send order 206 or other information to the provider 94 for further document delivery.

Figure 6:
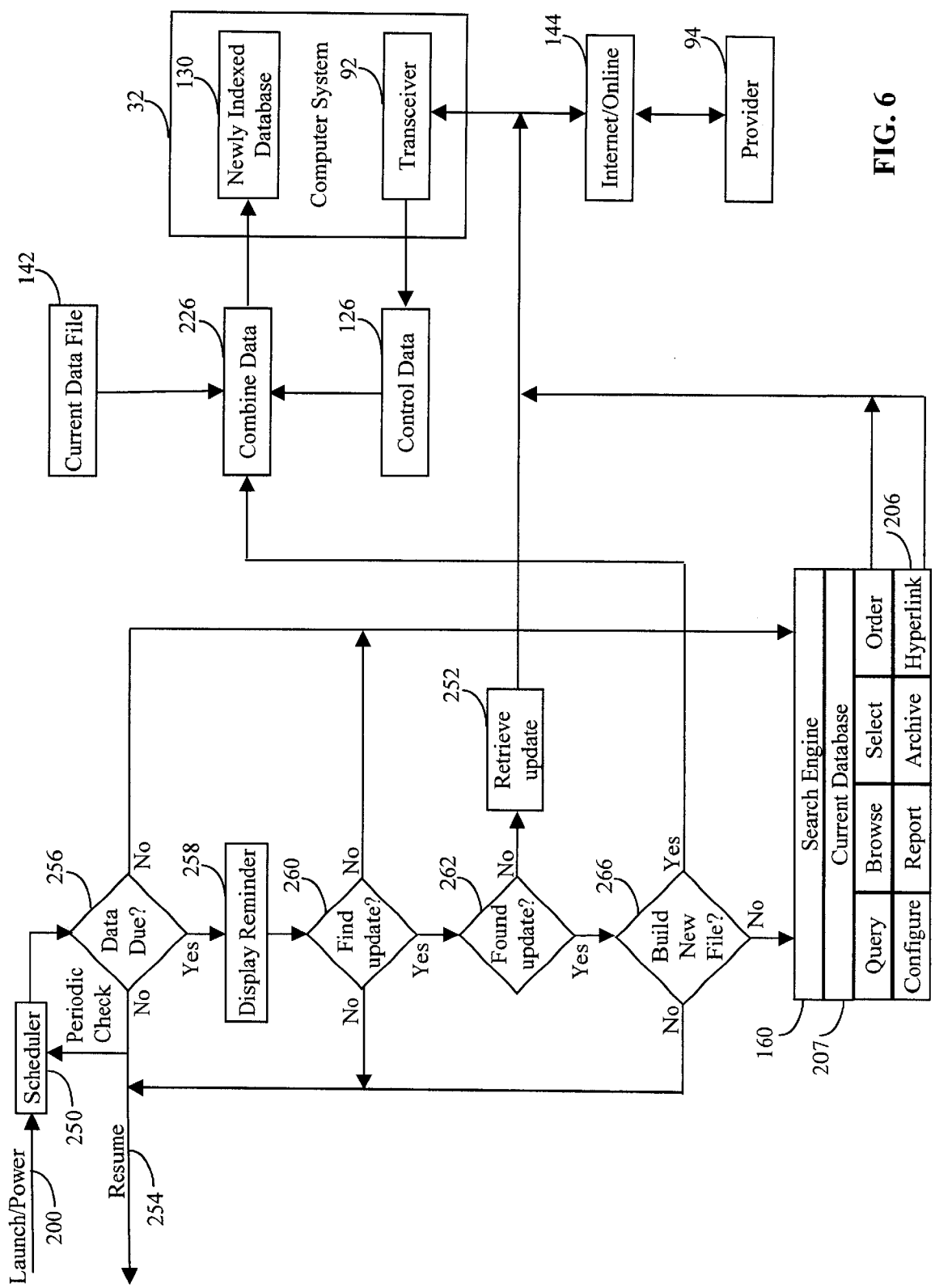
FIG. 6 is an alternative aspect of the present invention that illustrates scheduling and data retrieval in accordance with the present invention.

In another aspect of the present invention, FIG. 6 illustrates how a scheduler 250 and update retrieval system 252 is integrated into the invention. First, when the computer system is powered up, the operating system is loaded and activates a scheduler 250 to periodically check the system time in comparison to the next scheduled delivery of control data 126. Computing activity is resumed 254 until the current system time exceeds the scheduled delivery time. In the event where the subscriber 96 launches 200 the program 34 and the control data 126 is not due 256, the program 34 enters the search engine 160 allowing the subscriber 96 to configure, query, browse, select, report, archive, order, or hyperlink 206 from the current database 207. In either case, when the control data is due 256, a message 258 is displayed 78 to remind the subscriber 96 that the control data 126 is overdue and asks if the subscriber 96 would like to obtain the latest update 260. If the control data is not due 256, depending upon which case, the computing activity is either resumed 254 by default, or the program 34 enters the search engine 160.

If the subscriber 96 would like to obtain the latest update 260, the program 34 then checks for new control data 126 by searching for the control data file 126 in a default data path. If no data is found 262, an update retrieval 252 procedure is launched to obtain the new control data 126 via the transceiver 92. Upon receipt of the control data 126 or when the data is found 262, a message 266 is displayed 78 that asks if the subscriber 96 would like the potentially reusable data 30 to be built and displayed 78. If not, depending upon which case, the computing activity is once again either resumed 254 by default, or the program 34 enters the search engine 160. If so, the program 34 combines 226 the new control data 126 with the corresponding current file 142 of potentially reusable data 30 and build an indexed database of newly available information 130 as requested by the subscriber 96. E-mail as a delivery mechanism is but one example. Other examples include automatically retrieving data files via HTTP, FTP, etc.

Figure 7A:
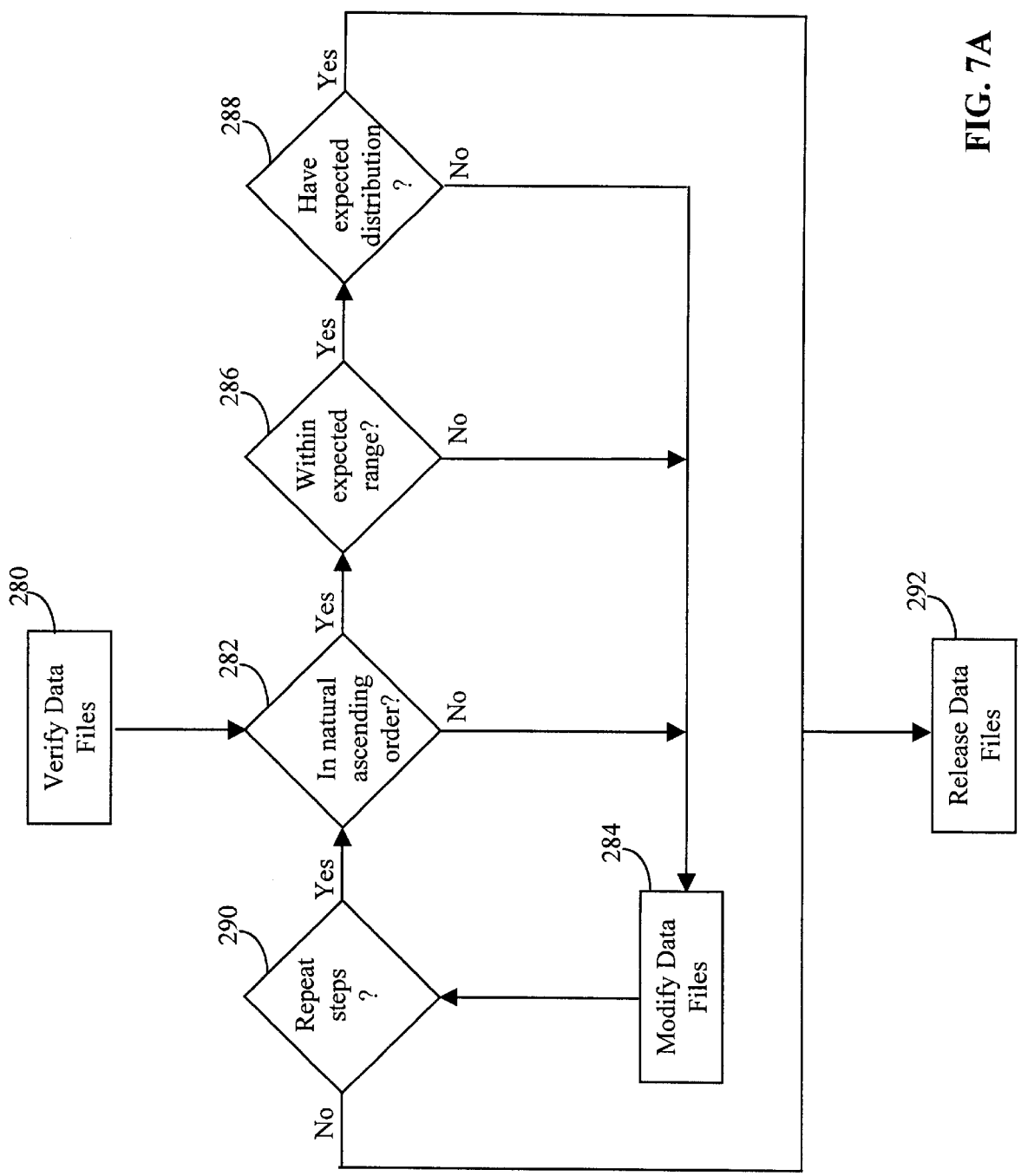
FIG. 7a is a flow chart of verification methods to assure quality and accuracy of newly released premature expired information in accordance with the present invention.

Referring now to FIG. 7a, steps are shown for verifying 280 either newly released or soon to be released expiring patent data. The patent numbers are checked for digit reversals of patent numbers in numerical order 282. By comparing each record of a database so that the patent number of the current record is always smaller than the patent number of the next record of the database, all records that do not meet this test are flagged to be modified 284. Since it is known in advance which patents could potentially expire early in a given week, all patent numbers to be verified should fall within an expected range of patent numbers 286. By comparing all patent numbers for their existence in a lookup table (see Table 7b) of expected ranges in a given week, patent numbers that do not meet this comparison are flagged to be modified 284. Periodically, the master list of the nearly 300,000 patent numbers currently expired is checked for omissions at different expiration levels. Variances are established by checking for the total number of patents expiring early in a current week and subtracting the total number of early expirations of the previous week. The variance is checked for all weeks, and variances that exceed an accepted level are flagged to be modified 284. After modifications,.the tests can be repeated 290 or if accepted, the new data is successfully verified and ready for release 292.

Figure 8:
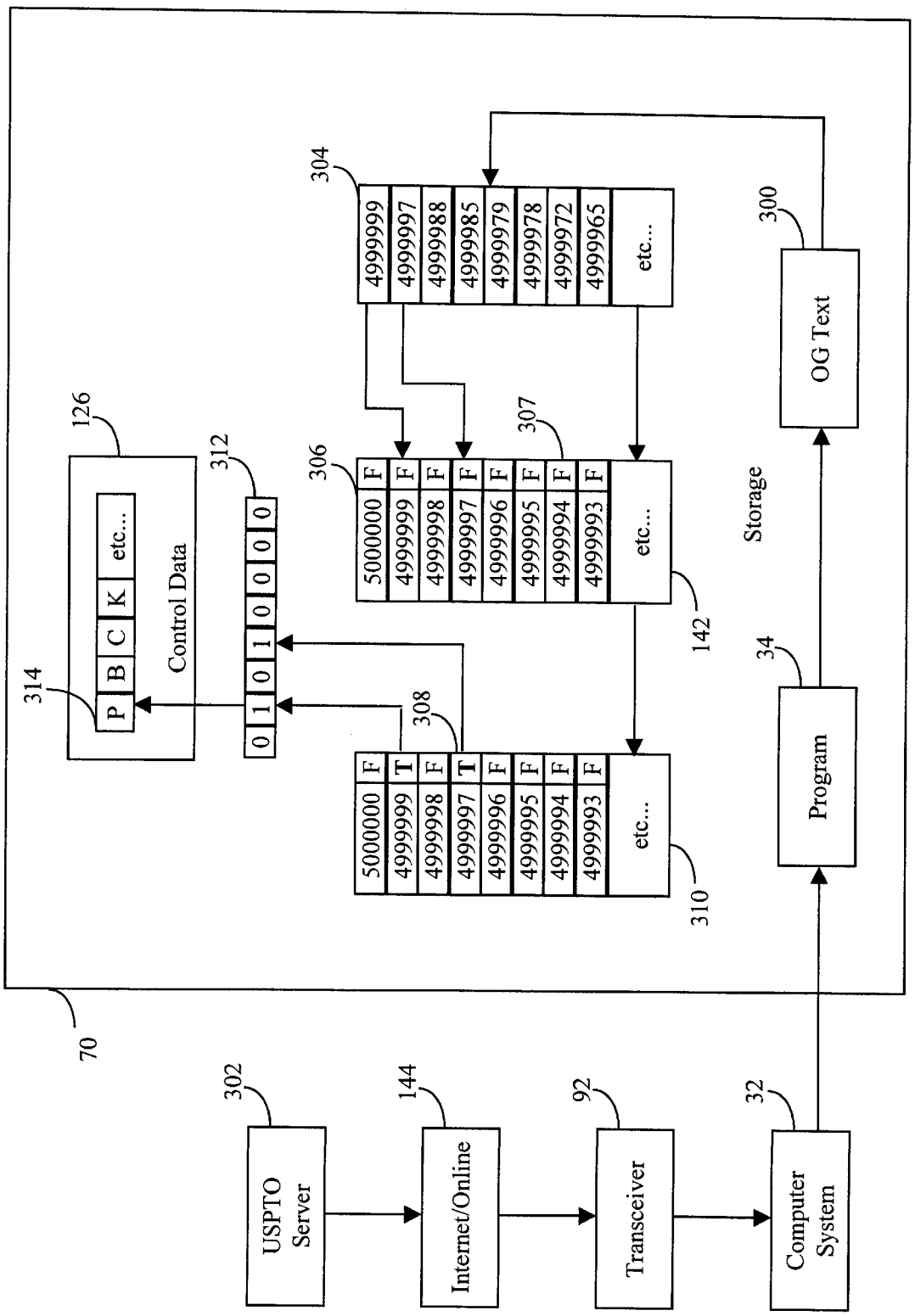
FIG. 8 is a flow chart of the steps taken to create and encode control data from a current set of reference data updates in accordance with the present invention.

Turning now to FIG. 8, the control data 126 is created for a subsequent delivery 122. The release of the current OG Notice 300 is received from the USPTO server 302 on the Internet 144 via the transceiver 92 of the computer system 32. Co-pending provisional application No. 60/154,411 is applied as a means for receiving any expected information update including the current OG Notice 300. A program 34 is executed and a temporary database 304 of patent numbers is created and indexed by extracting the premature expired patent numbers from the text file of the OG Notice 300. A relation is set into the temporary database 304 from a current data file 142, which is identical to the subscriber's current file 142 of potentially reusable data 30. By default, all of the records have a logical value of FALSE 307 in the expired field 306. The expired field 306 of the current data file 142 is modified to a logical value of TRUE 308 for all matching records of this relation. Starting from the first record of the modified 310 current data file in batches of eight records at a time, an eight bit string composed of 1's and 0's is formed 312 where the logical value of TRUE 308 in the expired field 306 for a given record is represented by a 1. The eight-bit string is converted into an equivalent binary value. The binary value is then further converted into its equivalent ASCII character 314. A string of ASCII characters 314 are formed by repeating the steps of encoding the data until the end of the modified 310 current data file is reached. The resultant encoded character string referred to as an encoded bit mask becomes the newly created control/reference data 126.

When an update is initiated by a provider, an encoded bit mask is generated by the provider based upon the known arrangement of data records of at least one data file or database residing on the subscriber side. This becomes particularly apparent when providing potentially reusable data stored on read-only portable storage media to a subscriber. At future intervals, a provider generates an encoded bit mask that is applicable specifically to the potentially reusable data stored on read-only portable storage media. When an update is initiated by a subscriber, the subscriber has the added option to send a variety of information such as subscriber preset query filters, 'top picks' information from the subscriber for the purposes of evaluation or document ordering, and subscriber log files that track index history, database revision and version information, etc. for the purpose of subscriber/provider database synchronization. This log information may be used for encoded bit mask generation on the provider side for delivery to the subscriber.

Figure 9:
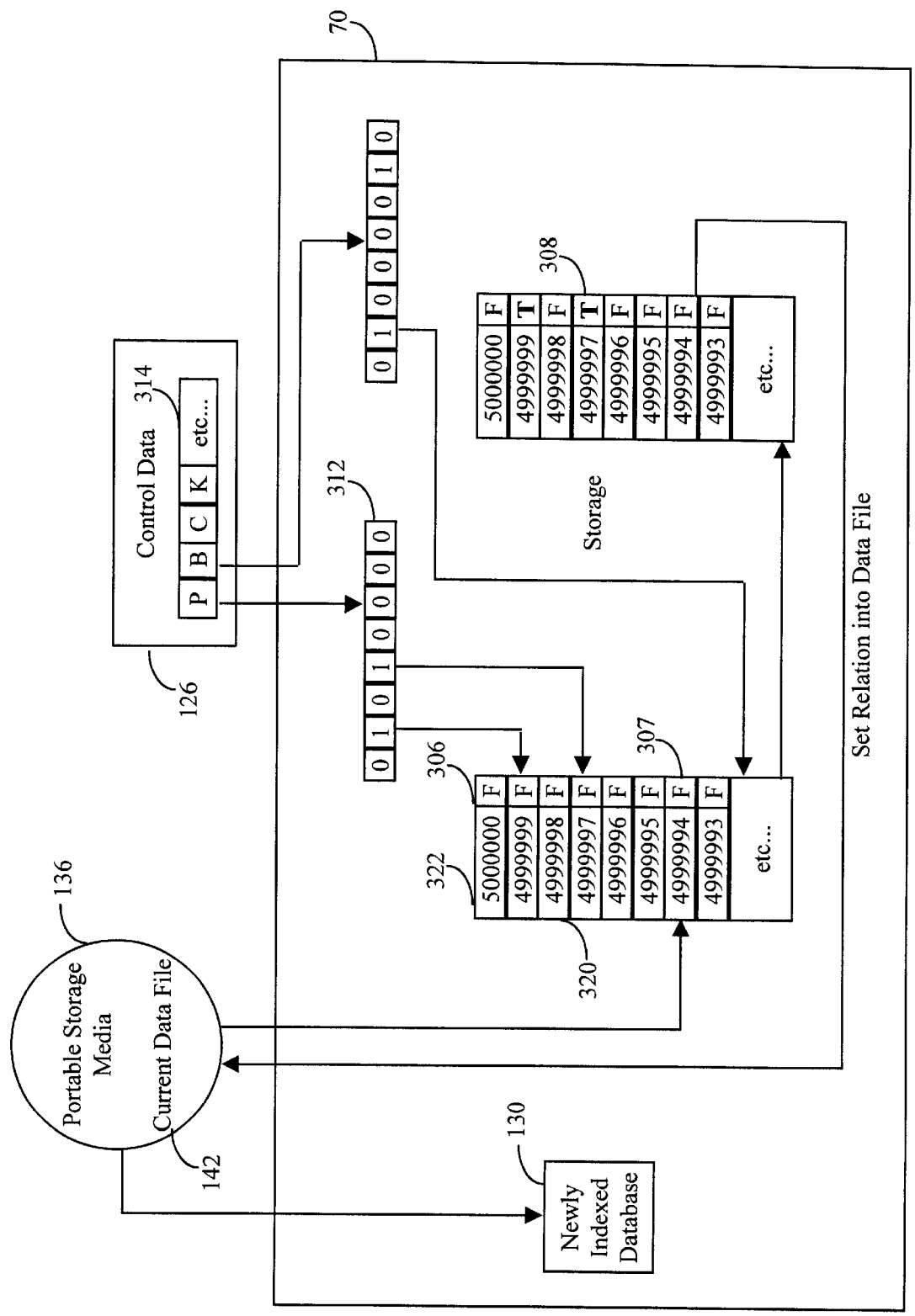
FIG. 9 is a flow chart of the steps taken to decode control data and create an indexed database of newly available information in accordance with the present invention.

Referring now to FIG. 9, steps are taken to combine the control data 126 with the current file 142 of potentially reusable data 30 in order to create an indexed database of newly available information 130. First, a temporary file 320 is created in storage 70 by copying the patent number field 322 and expired field 306 only, from all of the records in the current data file 142 located on the portable storage media 136. By default, all of the records have a logical value of FALSE 307 in the expired field 306. The control data 126 is composed of ASCII characters 314, which represent what records to modify in the expired field 306 of the temporary file 320. The control data or encoded bit mask 126 is decoded by converting each ASCII character 314 to an equivalent binary value. The binary value is then further converted into an eight bit string 312 composed of only 1's and 0's that represents the binary value. Starting from the first record of the temporary file 320 and the first character 314 of the control data 126, the expired field 306 of the temporary file 320 is modified to a logical value of TRUE 308 for all records where the record position of the temporary file 320 equals the character position of the 1's in the decoded character string 312. The steps of decoding and modification are continued until the end of the control data file 126 is reached. A relation is then set from the temporary file 320 to flag the newly available information 130 from the current file 142 of potential reusable data 30 on the portable storage media 136. The flagged records are then copied and indexed to storage 70 to form an indexed database of newly available information 130. Though a preferred aspect of the present invention is to use the encoding/decoding methods discussed in FIG. 8 and FIG. 9, another means of updating the subscriber is sending the OG Notice as is from the PTO when it is published online. The executable program can then be modified to parse the premature expired patent numbers that is used to create at the subscriber computer system a new release of searchable premature expired information.

Although it is unknown which patents will prematurely expire each week, the total number of patents previously issued that have the potential to expire early in a given week is known. By assigning a status bit to each of the patents that can potentially expire early, then dividing the total by eight and rounding, the maximum minimized transmission size of the delivery in bytes can be calculated in advance for any given week. The table in FIG. 10a shows the projected delivery sizes of the control data for the second half of the year 1996. The four, eight, and twelve-year columns represent the number of patents previously issued that have the potential to expire early in a given week. The last four columns in the table show modified values due to previous premature expirations that can reduce the size of the delivery of control data by about 15%. Patents issued eight years ago have already had premature expirations four years ago, and patents issued twelve years ago have already had premature expirations four and eight years ago.

Figure 10B:
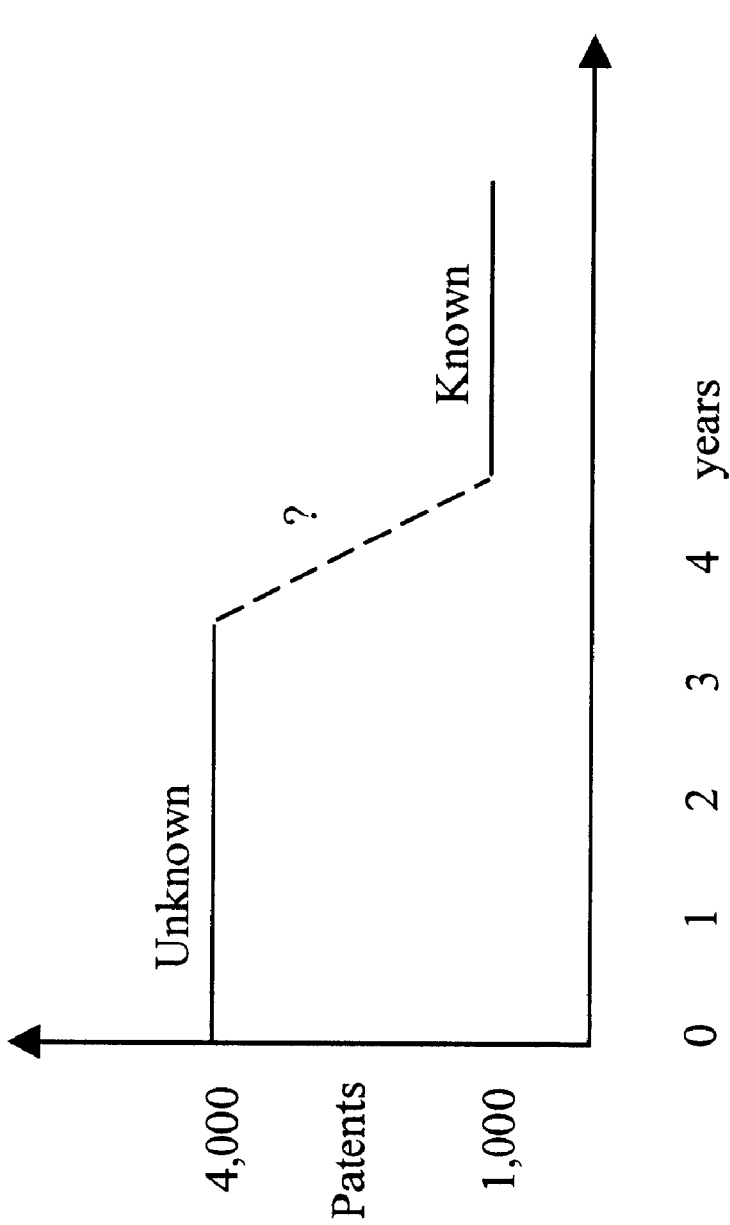
FIG. 10b is a graph showing the change in the potential of premature expiration in accordance with the present invention.

There is a way to further reduce the maximum minimized transmission size of the delivery of control data and reduce the storage size of the potentially reusable data per week allowing more weeks to be sent in advance, thereby increasing the subscription period of the disc. The potential for a patent to prematurely expire is created at the time of issuance, and in turn, that potential is removed upon a patent's premature expiration. For example, the graph in FIG. 10b shows that there are about 4,000 patents that have the potential to expire early, and of those, only about 1,000 patents actually do expire early in a given week. The number of patents that actually lapse for a given week is unknown, and thus creating the potential. The fact that a potential was created and then later removed shows not only the existence of potential, but also a change in potential. The fact that maintenance fees can not be paid earlier than one year before the premature expiration of the patent means that the potential for the patent to expire early does not change for the first three years of the expiration cycle. For the case of patents, the expiration cycle is four years. For trademarks, the expiration cycle is ten years. It is to be appreciated that the present invention may be applied to trademarks or other forfeited property rights in an analogous manner as mentioned above with respect to patents.

From the above example, it is gathered that the maintenance fees of about 3,000 patents have been paid during the last year of the expiration cycle. As fees are paid, there are less patents that have the potential to expire early, thereby creating more space on a portable storage media resulting in the possibility for a longer subscription period. For example, if renewal fees are paid linearly, then there is a total of near 60 renewals for each week. A portable storage media can be delivered, where the first data file includes next week's potential premature expirations of about 1,060 patents. The following week would have about 1,120 patents and so forth. At this rate, 50 weeks of potentially reusable data would total to about 126,500 patents. Without immediate access to renewal information, the potential number of patents to expire early per week can not be reduced. In light of this, by dividing the 126,500 patents by the 4,000 patents that have the potential to expire early in a given week, only 31 complete weeks of information can be stored in the same space as the 50 weeks, thereby increasing the subscription period by 60%. As shown, by using renewal information, the minimum of potential expirations can drop to as low as about 1,060 patents. Dividing by 8 and rounding, the minimum minimized transmission size of the delivery can be calculated to about 133 bytes, thereby further reducing the on-line transmission size by as much as an additional 74%.

The benefits of an increased subscription period becomes critical when applying this application particularly to the search and retrieval of patent document images on Digital Versatile Disc (DVD-ROM). A single layer, single sided DVD-ROM has a maximum storage capacity of about 4.7 GB, and is seven times greater than the storage capacity of CD-ROM which is about 650 MB. Currently, about 1,000 searchable patent document images can fit on CD-ROM, and in turn, roughly 7,000 patents can be placed on DVD-ROM. By placing 4,000 patents per week on disc, as stated from the above example, only one week of patent document images that have the potential to expire early can fit on DVD-ROM. However, if there is access to renewal information, a full six weeks of patent document images that have the potential to expire early can be stored in advance, thereby increasing the subscription period by 600%. This DVD-ROM application serves further utility because it removes the need for on-line document retrieval. By streamlining the document delivery process, the subscriber 96 is saved the cost and time of on-line document ordering, and allows for complete privacy of unlimited off-line searching, retrieval, and reporting of premature expired patent documents.

While a patent is in effect, the utility to the public is the knowledge gained from the disclosure of the invention. When a patent expires, the utility to the public changes, allowing anyone to practice or use the knowledge gained from the patent by 'making, using, or selling the invention.' There is in turn an on-line implementation for reducing the search and retrieval time of premature expired patent documents. As shown, the premature expiration of a patent is seen, if at all, as a status or subset of all patents. As a result, all search requests for premature expirations, if any, are searched in relation to a database of all patents. Because the utility to the public of premature expired patent information changes, the arrangement of premature expired data offers new use when searched. The premature expired information is partitioned and arranged as a new set of data (independent of its previous subset or status in relation to all data) and its resultant search time becomes significantly reduced. This new compilation restores the temporal displacement of information resulting from the potential of multiple premature expirations. Applying a search and retrieval system to this new compilation gives the user reduced storage and increased access speed regardless of where the compilation resides.

The primary goal of information dissemination of public information is to increase the potential of its accessibility to the public. This is accomplished by reducing distribution costs and creating incentives for the ease of retrieval that has been previously shown. Currently, the premature expiration status of a patent can be searched on the CASSIS-BIB disc or searched via a dedicated on-line connection to a select few commercial data vendors at most. There have been patent servers in existence on the Internet for more than two years offering up to twenty-seven different fields for selective searching of patent information. However, there are no patent servers of any kind on the Internet that allow for the specific search of premature expired patent information.

Because patent examiners have had no immediate use for premature expired information, the APS data available to commercial data vendors and the public has never been designed to be reconciled with future premature expirations. Furthermore, commercial data vendors have been motivated by the profits of existing niche markets, and in turn, have had no immediate need or basis to solve the problem of facilitating access of premature expired patents or trademarks to the public at large. Even though compiled or partitioned arrangement of premature expired patent information is the best way to search for it, as of yet there is no evidence or intention by anyone or any entity to facilitate searching on the Internet for premature expired patent information regardless of whether the arrangement of premature expired patent information is compiled or not (e.g. centralized/distributed).

The aspects of the present invention as discussed above are specific to a preferred set of embodiments that focus on the renewal or expiration of a data record. In effect, the delivery of data records that are selected and arranged (e.g. sorted, ordered) by potential expiration date to a subscriber serves as a functional arrangement of data which serves use at a future date or repeated use at future dates. The data arrangement becomes immediately useful for quickly searching those records that may soon potentially expire and such arrangement serves a further use at a later date when it is determined what records from the arrangement have actually expired. By creating a long term data cache sorted by renewal date or date of potential expiration, small amounts of data records (which are typically scattered through large amounts of data) can be consecutively buffered, in advance, to minimize bandwidth of final delivery for determining what data has or has not been renewed/ expired.

Figure 10C:
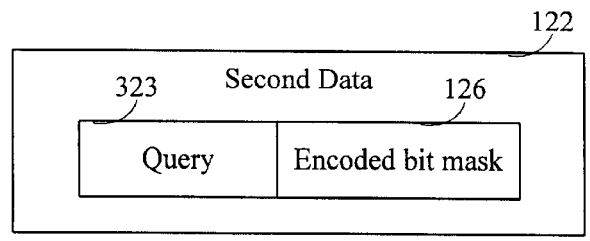
FIG. 10c is an illustration of a more detailed view of reference data in accordance with the present invention.

When different data fields have variable expiration periods or when different portions of the database are updateable, a query or query structure is included with the delivery of the control data so that a subset of data is remotely determined and/or generated on the subscriber/ client side for the encoded bit mask to be overlaid to determine the "new" information update derived from a portion of the existing data. Rather than sending a bit for every data record on the subscriber/client side, FIG. 10c illustrates a more detailed view of reference data 122 by including a query 323 to select a portion of the database and an encoded bit mask 126 to represent the status of the query and further reduce bandwidth and control/reference data size.

Figure 10D:
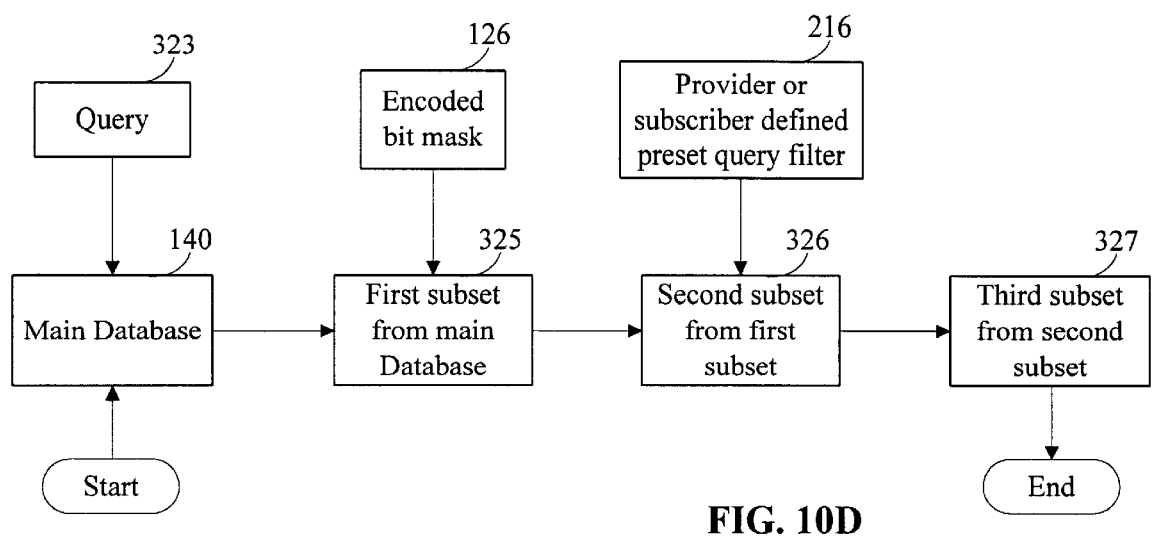
FIG. 10d is a flow chart of the steps taken to distill desired information in accordance with the present invention.

There are broader aspects of the present invention that are applicable to the subject of remotely updating data such as data files and/or databases particularly pertaining to data having a very large file size or having millions of data records. The issue date or expiry date are arbitrary fields in a data file or database, which is used to derive new use based upon unknown status/control/reference data determined at a later date. As shown in FIG. 10d, further novelty can be shown which is applicable to any data element or data elements (field/fields) of a database 140 or any substantial portion thereof. In effect as discussed, data records sharing a common expiry date (An initial query 323) constitute a first subset 325 of data records of the database 140 wherein a second subset 326 within the first subset 325 of the database 140 is determined at a later date from the delivered encoded bit mask 126. In turn, the user/provider/subscriber preset query filter 216 can be viewed as a third subset 327 within the second subset of data 326. In general, the selection of recursive data subsets from a previous data subset over time is applied to distill and compile data of new use.

For example, there is a database having 8 million data records (such as a telephone number database for a given area code) which would require a maximum minimum delivery size of control data representing 8 million bits or 1 million bytes (1 Meg) of data to determine a status update or to generate a new compilation from a subset of data records. In this case, such an update represents the notification of available telephone numbers for a given area code for a given time. After an apparatus performs the information update in accordance with the present invention, the generated list of available telephone numbers are then used to create mnemonic representations of such numbers for the purpose of making a list available to the public that is desirable to those interested in using telephone numbers for reasons of vanity, commercial interest, or that such available numbers are easier to remember, etc.

When an update for a given telephone exchange is needed. Rather than sending the 1 Meg update spanning all data records, 10,000 bits (1.25 K bytes) and a query such as a SQL statement having the search term "212-555" which equates to a couple hundred bytes at most are sent as control data. The present invention is further configured to receive the control data, query the main database, generate a smaller database representing a subset of 10,000 data records for the telephone numbers that range from "212-555-0000" to "212-555-9999". After database generation, the encoded bit mask of 10,000 bits is overlaid over the first subset to generate a second subset to finally compile and determine the phone numbers available for the given telephone exchange. By creating recursive data subsets the file size of the control data is compressed by a ratio as of roughly 750:1 or so.

Though it may be unknown when a property is forfeited, the holding, pending, or grace period of a property is known before such property enters the public domain. For instance, immediate use can be made by the public having access to those telephone numbers that are on hold before it is determined what telephone numbers are newly available. When a subscriber or provider terminates service of a telephone number, the telephone number is held ninety days for residents and one year for businesses before released and made available to other subscribers. During this pending time, a subscriber may renew service so it is unclear as to what telephone numbers are inevitably available at the release date of the telephone number.

Figure 10E:
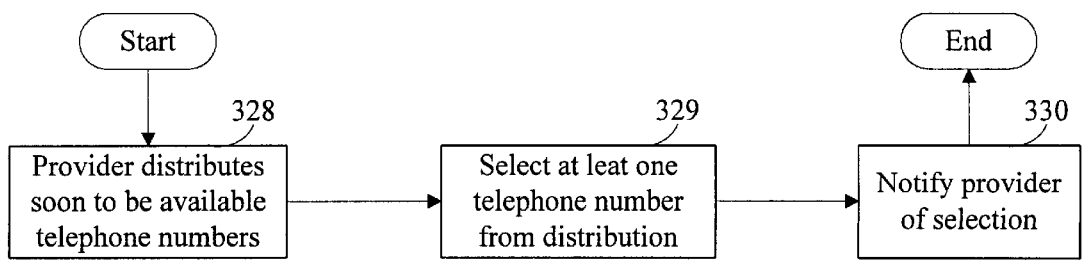
FIG. 10e is a flow chart of the steps taken to notify a provider of a data selection from a subscriber in accordance with the present invention.

Referring to FIG. 10e, steps are illustrated which indicate how a provider 94 is notified 330 of a data selection 329 that may soon become available 328. Registered identifiers such as telephone numbers and domain names have the potential of becoming newly available for registration. For example, each day new forfeited telephone numbers that are put on hold can be transmitted to the public 328. In addition, a control/reference file can be sent and combined with previously transmitted telephone numbers that are on hold to compile a subset of newly available subscriber telephone numbers. The invention is not limited to sending the control/ reference data to generate telephone numbers, but rather, a list of telephone numbers can be sent as is instead.

The subscriber/client can use an executable program to make mnemonic conversions of the telephone numbers into letters to determine and select 329 which phone numbers might have a personal significance, or commercial purpose, etc. yielding further information for the subscriber 96 to identify potentially newly available desirable telephone numbers in advance. Features of such a program include, converting numbers into words (including words that have more than 7 letters; e.g., 1-555-288-6662=1-555-AUT-OMOB=1-555-AUTOMOBILE), repeating digits (e.g. retrieving all available numbers ending in "00" across all central exchanges), etc. A reverse bidding model can be applied to those skilled in the art to notify providers 330 by having subscribers monitor, pre-order, or pre-register soon to be available telephone numbers from Licensed Phone Registrars (LPRs) who compete for random electronic bidding when telephone numbers do become available for subcription.

The invention has further application when telephone databases are partitioned in a reverse hierarchy. For instance, an "8800" database is created having data records representing telephone numbers across scattered geographies in the form of NPA-NXX-8800. An "8800" control file is sent, so that at any given point in time, the availability of telephone numbers ending with the number "8800" can be determined with minimized transmission of reference data.

Another field of application pertains to the availability of domain names. In addition to telephone numbers, identifiers such as domain names that may soon be available can be queried by a subscriber 96 or distributed 328 in advance to a subscriber 96 as well, so that domain names of interest can be selected 329 with the option of being ordered, registered, subscribed, or reserved 330 in a preordering queue from either the client 110 or server 114 side. A registration form with completed registration information can be submitted (not shown) to or by a registrar when the soon to be available domain name that is selected does become available for registration.

Methods can be applied to TLD zone files for determining registration or expiration dates of domain names. These methods are used to overcome the inability of accessing the registration dates of domain names from the WHOIS database. The TLD zone files are used to help perform the function of routing Internet communications. Further use can be derived from the TLD zone files by determining the difference between TLD-zone file updates and extract both new domain names issued and old domain names that are inactive into at least one database. Registration dates and expiry dates are assigned accordingly to such extracted domain name data. More specifically, each release of a given TLD zone file is compared to the previous TLD zone file released. Those entries that no longer exist are appended to a soon to be available domain name database. Entries that have never existed are assigned a registration date and appended to a newly issued domain name database. Near two years later when such newly registered domain names may potentially expire for failure to pay renewal fees, data sets of domain names are formed by expiry time and cached by appending such data sets to the soon to be available domain name database. After applying this method for two years new utility can be derived by updated subsets of domain names that may potentially lapse into the public domain.

Figure 11:
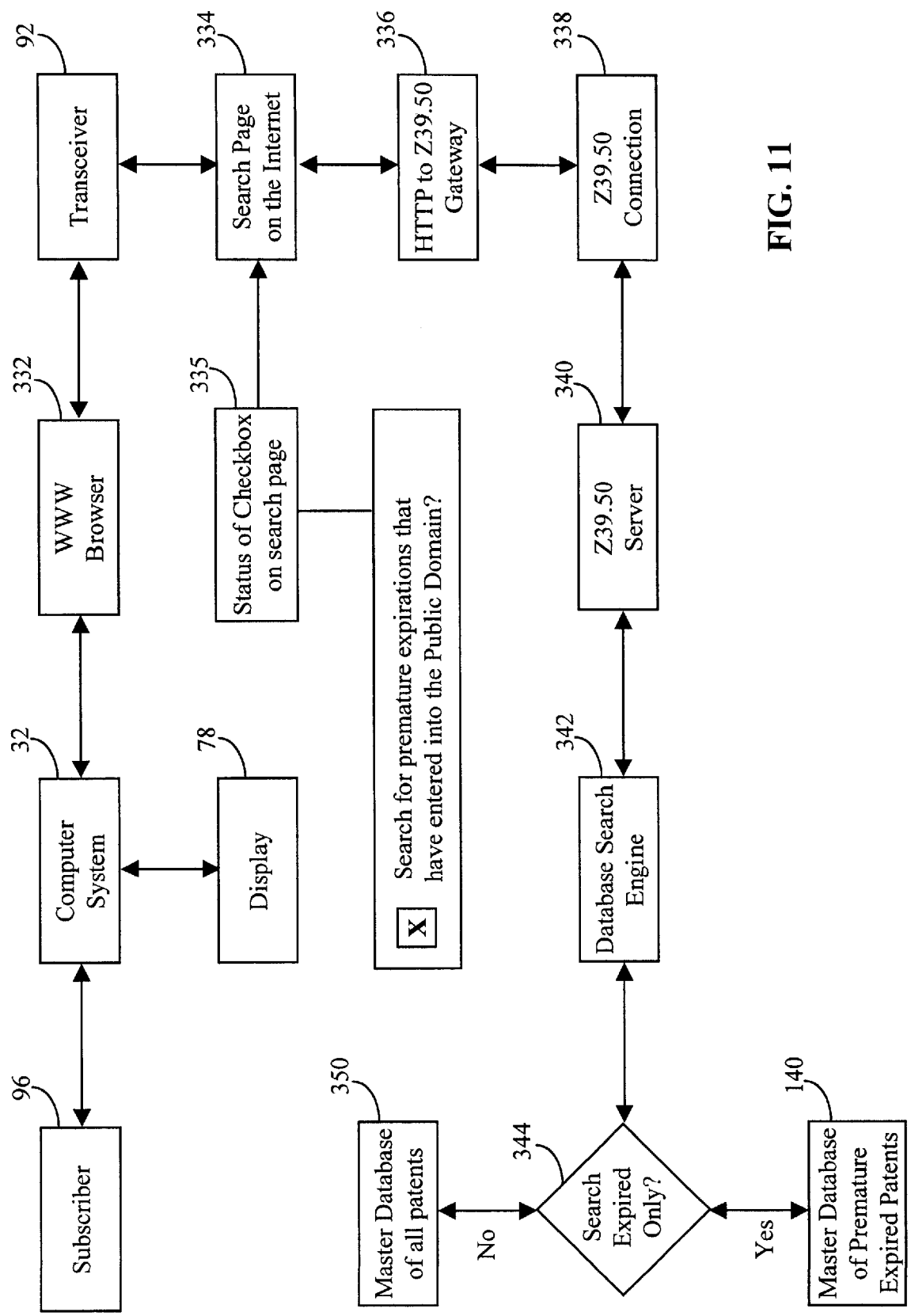
FIG. 11 is a flowchart showing how a partitioned database of premature expired patents is accessed on-line via the Internet in accordance with the present invention.

Turning now to FIG. 11, a subscriber 96 performs a query on a web page 334 at a web site on the Internet via the transceiver 92 of a computer system 32 by using a World Wide Web (WWW) browser 332 which is a program that interprets many different on-line protocols and displays 78 such information received by these protocols in a desired manner to the subscriber 96. One such protocol called the HyperText Transfer Protocol (HTTP) is the most common method to access information via the web pages 334 of a Web server on the Internet.

Requests for information accessed are sent and received in the form of HyperText Markup Language (HTML) which is an understood format for the HTTP. Another communications protocol that has been universally accepted as a standard for on-line database searching is called the Z39.50 protocol. The Z39.50 server 340 accepts TCP connections from the transceiver 92 of a computer system 32 and requests to search and retrieve from available databases accessible through the database search engine 342.

When a subscriber 96 requests a patent search at the provider's search page 334 on the Internet, a connection to the correct database is established before a query session can begin. The status of a checkbox 335 is assessed to see if the subscriber would like to intentionally search for premature expirations that have entered into the public domain. The WWW browser 332 connects to the HTTP server 334 at a web site on the Internet and posts a HTML form containing information related to a new or existing Z39.50 session. The Z39.50 gateway 336 parses the HTML form and starts a new Z39.50 connection 338 or connects to an existing Z39.50 connection 338. The subscriber's request is then passed from the Z39.50 gateway 336 to the appropriate Z39.50 connection 338, which in turn communicates with the remote Z39.50 server 340. A query is extracted from the parsed HTML form and is passed on from the Z39.50 server to the database search engine 342 for obtaining search results. Based on the status of the checkbox 335, the search engine 342 decides 344 to query either the premature expired patent database 140 or the entire patent database 350. The search and retrieval of premature expired patents can be obtained regardless of which database is being used. The results are passed back from the Z39.50 server 340 to the Z39.50 connection 338, back to the Z39.50 gateway 336, to the HTTP server 334 and back to the WWW browser 332 for display 78 to the subscriber 96. The Z39.50 gateway 336 process then exits, but the associated Z39.50 connection 338 process stays, holding open the Z39.50 connection 338. If a Z39.50 connection 338 process receives no input for a pre-configured period of time, then the connection times out and exits.

Providing two separate databases is but one implementation of illustrating the exclusive use of a compiled master premature expired database. Instead of a status checkbox, a web page or web site is used exclusively for the display and selection of premature expired property listings or for the search and retrieval of premature expired property information only. To date, the patent community has neglected to offer services devoted exclusively to the publication of premature expired information. The compiled database remains, to date, an overlooked resource that has never been utilized as a "new" self-contained whole having its own utility and does not rely upon the utility from the original data source from where the compilation is derived. Another implementation is to have a main index and a premature expired index that both correspond to one master database of all patents. Yet another implementation of the status checkbox is to determine which index to select and use to retrieve data from a main database rather than determining which database to select.

Figure 12A:
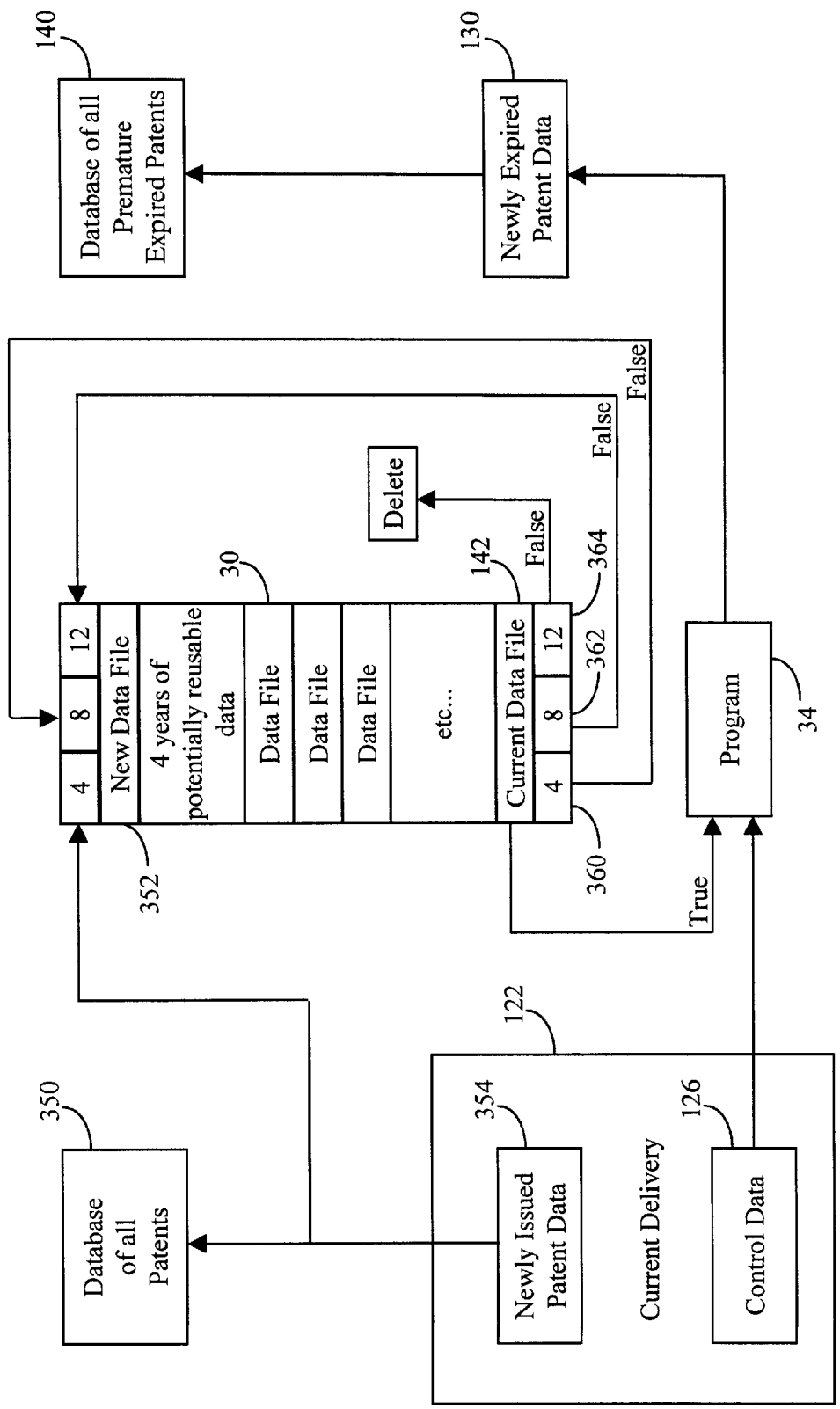
FIG. 12a is a flow chart of the steps taken to update the master databases and create a new file of potentially reusable data from a current delivery in accordance with the present invention.
Figure 12B:
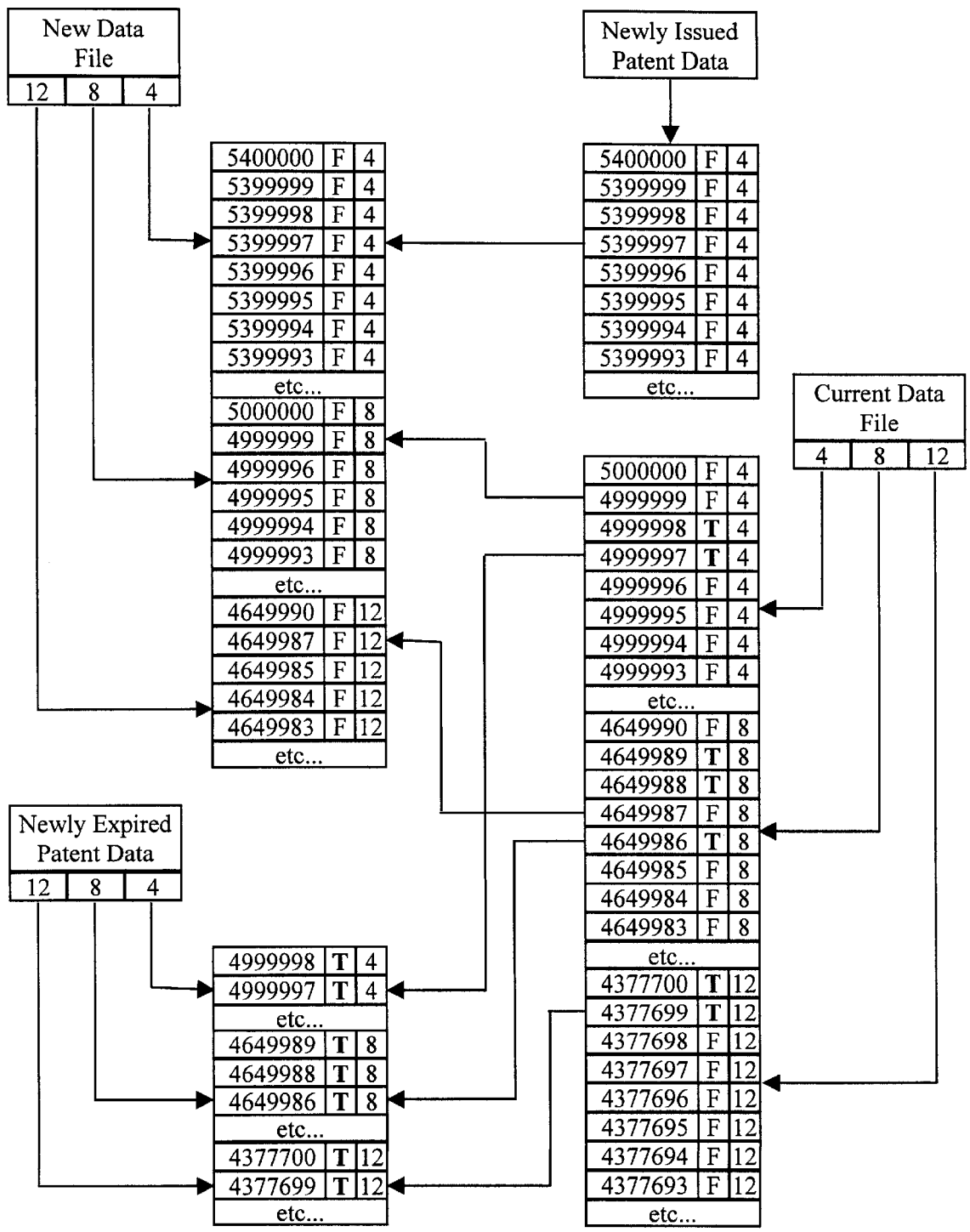
FIG. 12b is a diagram of the relationship of the data structures needed to create a new file of potentially reusable data in accordance with the present invention.

Referring now to FIG. 12a, steps are shown to update a master database of all patents 350, a master database of premature expired patents 140, and to create a new file 352 of potentially reusable data 30. A program 34 is executed to receive a current delivery 122 of data containing both newly issued patent data 354 and control data 126. The newly issued patent data 354 is appended to update the master database of all patent information 350. As previously discussed, all records having a logical value of TRUE in the expired field of the current data file 142 are extracted by the program 34 to form the newest premature expired patents 130, which in turn is appended to update the master database of all premature expired patents 140. A new file 352 of potentially reusable data 30 is created by first copying newly issued patent data 354 to a new data file 352. The expired level field of the current data file 142 is then incremented to the next potential expiration level and is modified by replacing a 4 with an 8, and an 8 with a 12 for all four 360 and eight year 362 records having a logical value of FALSE in the expired field of the current data file 142. The modified data is then appended to the new data file 352 creating a new file 352 of potentially reusable data 30. The next level of expiration for twelve year 364 records having a logical value of FALSE are final. Therefore, the twelve year 364 records have no further use. All records of the current data file 142 have been updated and put into other files and in turn, have no further use. The current data file 142 is then deleted. A block diagram of FIG. 12b further illustrates the relationships of the data structures involved for creating a new file of potentially reusable data as discussed in FIG. 12a.

Figure 13:
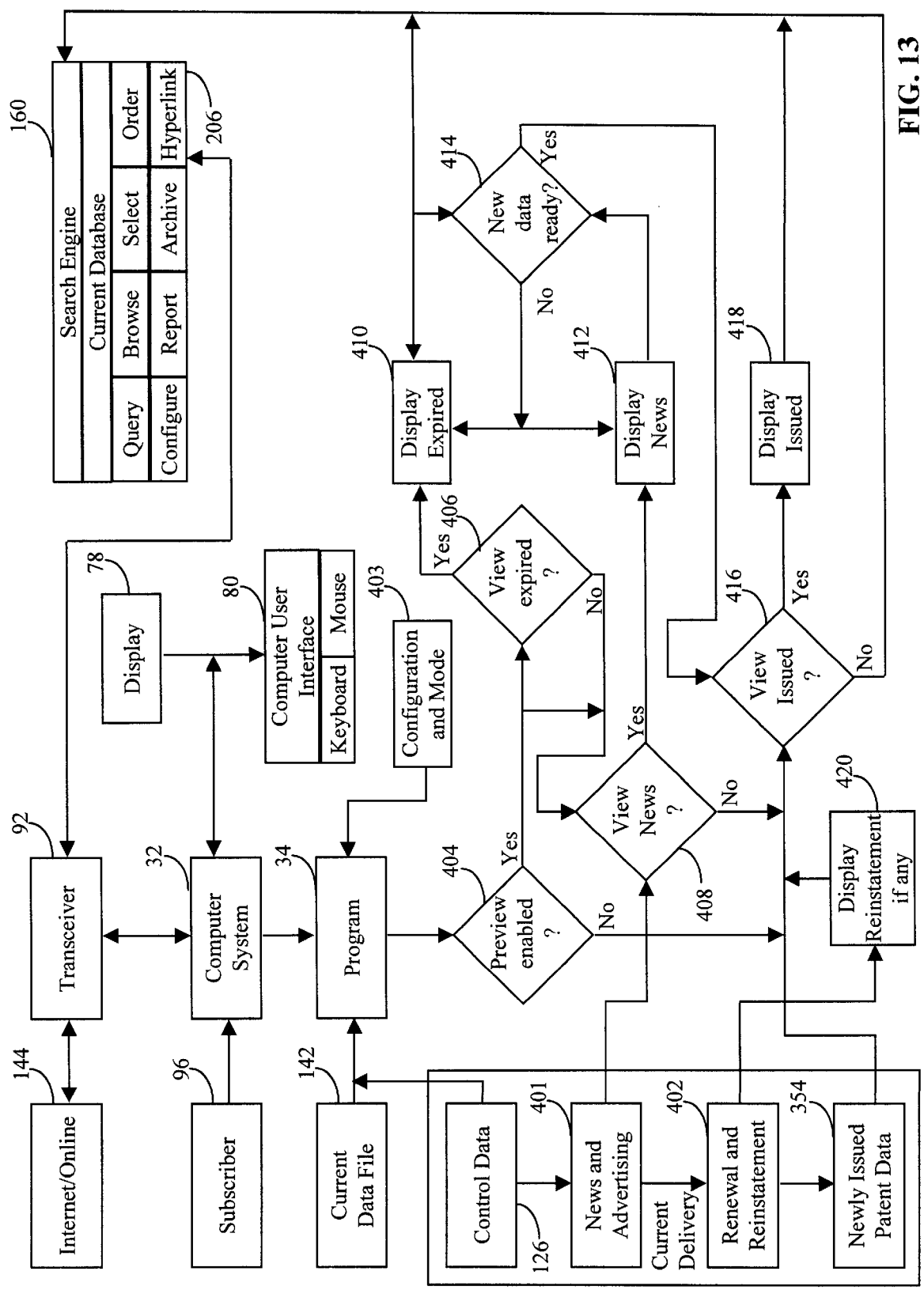
FIG. 13 is a flow chart showing the relationship of sending new data in conjunction with control data in accordance with the present invention.

The flowchart of FIG. 13 shows the utilization of the time delay between receiving the newest patents that have prematurely expired 130, and newly issued patents 354. A subscriber 96 obtains a current delivery 400 including control data 126, news and advertising data 401, renewal, reinstatement and other status data 402, and newly issued patent data 354 by launching a program 34 that receives the current delivery 400 from the Internet 144 via the transceiver 92 of the computer system 32. Because of download size, installation, and remote indexing, the total delivery can take up to 15 minutes via 56 K modem to view newly issued patent information 354. This download time can be utilized by viewing the newest premature expired patent information 130 and/or patent news and advertising of current events 401. Also, there are options to display any reinstatement information 420 that might be present. The files are downloaded in a batch where the control data 126 takes seconds to receive. In turn news and advertising data 401 can take less than 60 seconds to be received. Advantage can be taken of the multitasking operating system and if so desired, build and view the newest premature expirations 130 in less than 90 seconds. While the newly issued data 354 is downloading, the program 34 retrieves configuration 403 information to determine if the preview mode is enabled 404 and if the preview mode 403 is automated. When the preview feature is enabled 404, a message is displayed 78 to view current expirations 406. If so, expirations are viewed 410 with search capabilities 160 until data is ready 414 with the option of viewing news 412 if enabled. If not, another message is displayed 78 to view the latest news and advertising 408. If so, news and advertising are viewed 412. When data is ready 414, or both the expirations 406 and news 408 are not to be viewed, or the automated preview service 404 is disabled, then a message is displayed 78 to ask if newly issued patents are to be viewed 416. If so, newly issued patents 354 are viewed 416 with search capabilities 160. If not, then the search engine 160 is activated. If the preview mode 403 is automated, then the above choices and messages are bypassed and subscriber 96 preferences are retrieved from configuration 403 to determine what preview features to display 78. At this point, the subscriber 96 can operate a computer user interface 80 (e.g. input device, such as a keyboard, mouse, etc.) to configure, query, browse, select, report, archive, order, or hyperlink 206 from the search engine 160 and connect to the Internet 144 or other on-line services via the transceiver 92 of the computer system 32 to view a selected document image and send order 206 or other information to the provider 94 for further document delivery.

Figure 14:
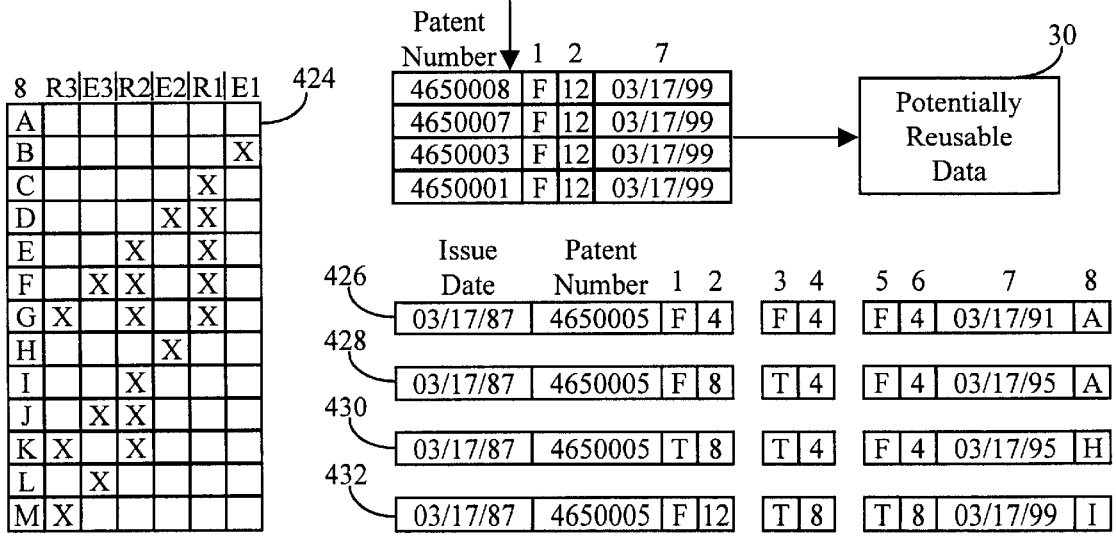
FIG. 14 is a diagram of data structures pertaining to status updates in patent databases in accordance with the present invention.

Turning now to FIG. 14, the data structures for status information are shown. It is necessary to extend the data structures of patent database information 422 to manage status updates. Fields 1 through 6 are used to list the most recent status change of premature expirations, reinstatements, and renewal of maintenance fees. Field 7 lists the potential date of expiration and field 8 shows a complete history of expiration updates in fields 1 through 6. There is a lookup table 424, that have 13 possible outcomes denoted by the characters A through M to determine the status history of a premature expiration during the patent's enforcement. The outcome corresponds to field 8 in the previous data structure 422. An example of the continued update for a given record 426 is provided. When a maintenance fee is paid 428, the renewal flag (field 3) is modified to a TRUE. In turn, the expired level (field 2), the potential expiration date (field 7), and the expiration status history are advanced to the eight year level. When the patent prematurely expires 430, the expired flag (field 1) is modified to a TRUE and the status history (field 8) is updated. When a late fee is paid 432, the renewal flag (field 3) and the reinstatement flag (field 5) are modified to a TRUE, the expired flag (field 1) is modified to a FALSE, and all other status records are advanced to the next level. Status updates are performed with respect to the anticipation of a future event to assure that the final step of updating is reduced to, if and when possible, the change of a single status bit only (i.e. upon the update of a premature expiration, the potential expiration date (field 7) becomes the actual expiration date). The usage for status updates are shown for example, by querying for all FALSE expired flags (field 1) and grouping data by potential expiration date (field 7). The updated data structures are then used to generate a batch of data files that include potentially reusable data 30 and placed on a portable storage media or sent to a subscriber for immediate transmission. The arrangement of data for each data file is optimized in advance to minimize data size of reference data for subsequent deliveries.

Figure 15:
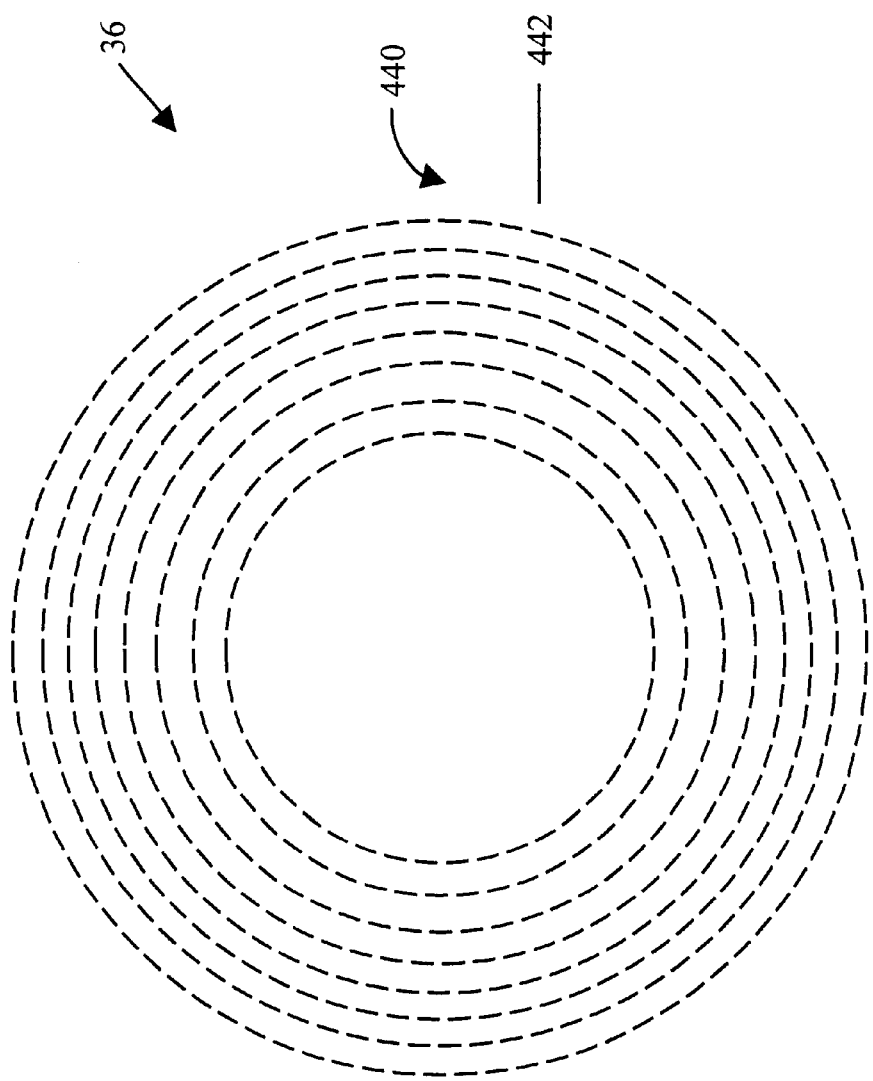
FIG. 15 is an elevation view of a portable storage medium in accordance with the present invention.

Turning now to FIG. 15, a preferred portable storage medium 62 is shown in accordance with the present invention. The preferred storage medium 62 is a diskette with representative tracks 440, each track 440 having sectors 442 such as for example sector 442. In the preferred aspect all tracks 440 contain two additional sectors 442 to provide for 160 KB of hidden partitions on an 80-track diskette. The update data of a current delivery 400 including control data 126, news and advertising data 401, renewal, reinstatement and other status data 402 is stored thereon so as to be inaccessible to some degree to conventional programs. The newly issued patent data 354 of the current delivery 400 is stored on the conventional storage portion of the diskette. By storing the current delivery of update data 400 in the hidden partitions, conventional storage capacity of the storage medium 62 is not reduced. The current delivery 400 is preferably stored in a compressed form and decompressed prior to installation to system.

The two additional sectors 442 at the end of each track 440 provide a rotational delay between the last conventional sector 442. The delay provides the disk drive enough time to reposition the head on the next track 440 before the first sector 442 of the next track 440 passes under the head thereby speeding up access to data on the diskette. However, it will be appreciated that the present invention has applicability to any suitable storage medium 62 (e.g., diskette, CD-ROM, tape drive, etc.).

As stated, the present invention is not limited to patent related information or other information that passes into the public domain, such as trademarks, domain names (e.g. WHOIS database of a NIC registry or registrar service), telephone numbers, and copyrights. The invention is also used to extend the reuse of information that has an ever-changing availability such as, but not limited to, any information having at least one renewal, expiry, or anniversary date or at least one pending, holding, or grace period. Other information includes a set of URls and content thereof, content stored on at least one computer readable medium such as storage media or stored in at least one cache, file, spreadsheet, database, or the like. Other examples of information/data include, press releases, intellectual property, real estate (property for sale, lease, rent, forfeitures of property and/or property tax, etc.), judgements, mortgage, liens, auctions, resumes and job availability, advertising (seasonal, personals, classifieds, etc.), news, price lists, periodicals, library books, leasing, licensing, rentals, scheduling (arrival/departure), permits and licenses (e.g. liquor license, etc.), parole dates, coupons, rebates, offers, top lists (top 10/40, bestsellers, etc.), and other lists (shopping, to do, scavenger hunt, etc.).

Other examples of different applications listed above are also discussed. For instance, service providers are licensed to use tiered subscribing and receive the "top 100" songs for a given publication period. Each week the new "top 40" songs. are determined and a delivery is sent to a licensed service provider of new songs from the "top 40" that are not part of the "top 100" songs. In addition, reference data/ control data is sent to determine which songs from the "top 100" are part of the "top 40" songs. Between receiving the combination of new songs and reference data, a new compilation of the "top 40" songs can be generated. Furthermore, smaller subsets can be derived such as releasing "top 10" songs, etc. These generated subsets can be used as a data source automated to be custom recorded on a portable storage media such in a CD or DVD type format or encoded as a real-time streaming multimedia audio format such as MP3 or Real Audio for access on a network such as the Internet. This method can be applied to any periodical ranking or listing system.

It is known in advance when a parole hearing is heard but is unknown as to the release date of a parolee. A notification service is used to inform the public of the premature release of a parolee. Victims and their family, friends, neighbors, community, and public for reasons of awareness and safety are notified of such information.

Library books, videotapes, other periodicals, and any circulation system where articles are temporarily unavailable are also applicable. For a given day, x number of articles have become unavailable and y number of articles have become available. A delivery of data is prepared that represents both x and y articles. Also, included in the delivery is an encoded update mechanism to indicate what books have been returned early (and/or late).

The duration. of the U.S. copyright protection for songs created on or after Jan. 1, 1978, is 50 years after the death of the author or last surviving co-author. For works created prior to Jan. 1, 1978, the duration of U.S. copyright protection is 75 years after the last day of the year in which the copyright was secured. If the composer was an employee of the publisher, therefore making the composition a "work-for-hire," the duration of the copyright protection is 75 years from the first publication, or 100 years from creation, whichever occurs first. Duration of copyright for countries outside of the United States is generally, but not always, 50 years after the death of the author or last surviving co-author. Again because works copyrighted prior to Jan. 1, 1978 in the U.S. are copyrighted for a certain set amount of years, this leads to inconsistencies when licensing for worldwide rights, and public domain status needs to be verified on a country-by-country basis, which can be a cumbersome and complicated process. Because it is unclear when a copyright enters the public domain, new databases can be created from a main copyright database stored on the subscriber/client side, as it is determined when a copyright will actually expire.

Citation reporting services can be improved by delivering, in advance, a citation cache of material (documents, abstracts, images, database, data files, etc.) that is more frequently cited than other material. For instance, each week as patent information is issued reference is made to prior art of other patents. By sending new patents with the references that correspond to prior art patents that have been delivered as a citation cache in advance, the results of citation reporting is accomplished reducing the bandwidth of each weekly delivery.

The records of all departures for a given time that spans all geography and all modes of scheduled travel are stored in a file or database. An encoded bit mask is then periodically sent to map over the file and is combined with stored data to notify passengers of any such flights that have changed departure time. In addition, those departures that are delayed can be appended to other files or databases that represent a later departure time. A subscriber can use the preset query filter as a means to notify one of specific travel information. The converse can be applied to arrival information as well.

Coupon and advertising delivery applications may only update partial information such as updated pricing, discount amount, expiration dates, and other pertinent data that is sent in conjunction with the control/reference data to form the newly indexed available information. The partial information is then combined with reusable components of a coupon, ad, rebate, offer, etc. having different expiration periods such as the brand/image/logo, store location, and/or any other information that has the context of being a reusable component and combined to form the renewed coupon, rebate, offer, or seasonal advertisement, etc.

Digital photos of commercial and residential real estate property for a selected geographic area is stored on a portable storage medium such as CD-ROM or DVD-ROM and delivered in a first delivery to subscribers. In a preferred aspect, a plurality of photos are used to provide front, side, back, or panoramic views of the property or the photos visually represent the property as viewed over the course of the seasons. For instance, photos of a property are taken both in the summer and winter. Subsequent deliveries of reference data can determine which seasonal photo is displayed based on the publication date of the reference data. In a more specific application, rental properties are partitioned by the renewal date of the rental lease. Reference data is generated for each partitioned data set and is used by the subscriber to display newly available properties in a given geographic area.

The listings of 800,000 job descriptions are placed on DVD-ROM and each week receive a 100 K file of control/ reference data to trigger which records to index and to display what jobs are available. In another example, the résumés of job applicants are placed on DVD-ROM. The applicants are either on or off the job search market for a given interval. The applicant may still want to be searched or notified by an employer or recruiter even when the applicant is off the market.

Figure 16:
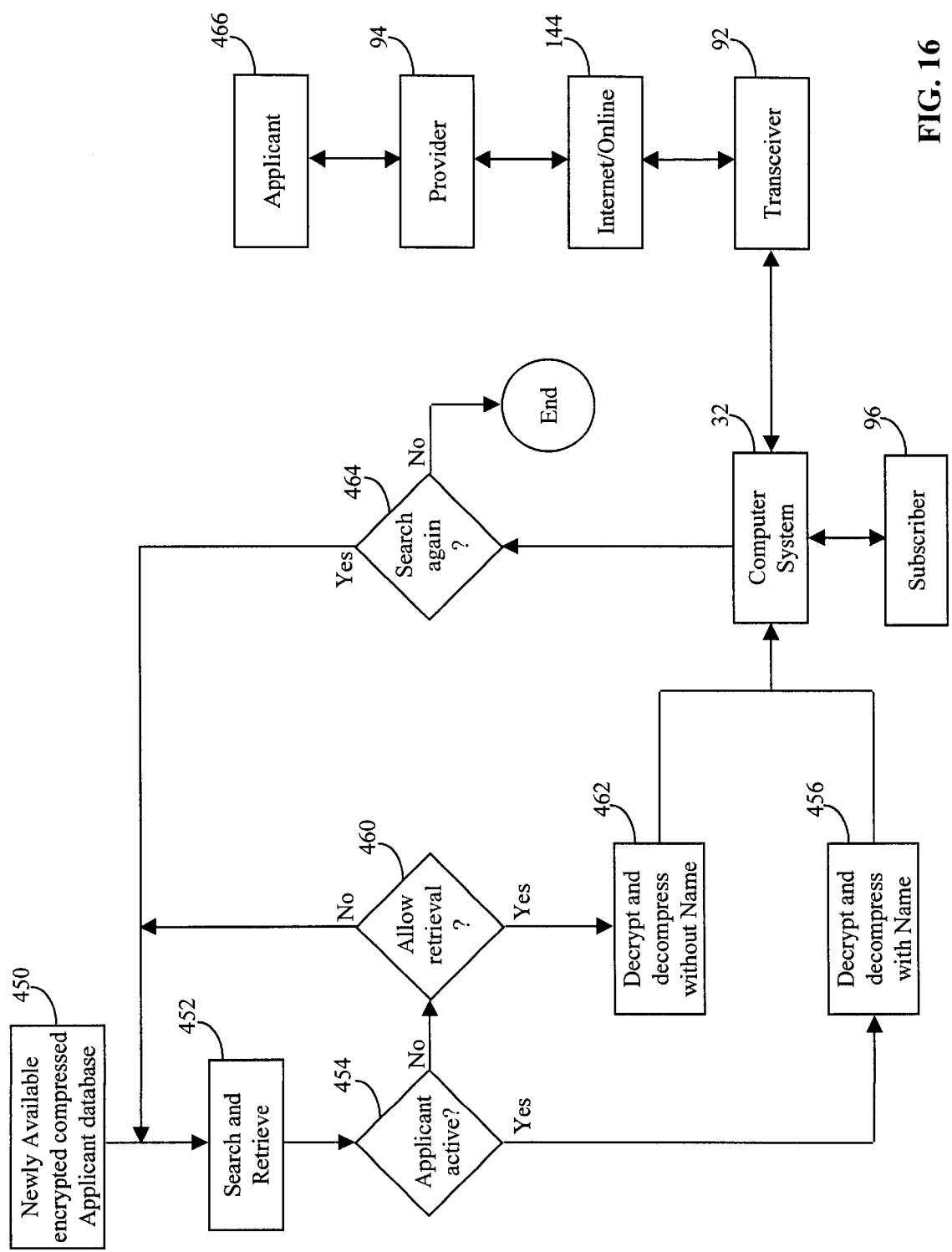
FIG. 16 is a flow chart showing how encryption and compression can be used in accordance with an alternative aspect of the present invention.

The flowchart of FIG. 16 shows an aspect that reuses the résumé information of job applicants. All applicant information is encrypted and compressed 450 for privacy. A search 452 is performed where the retrieval 452 of the search 452 is displayed 78 based on the applicant's status. All records where the status of the applicant is active 454 are decrypted and decompressed, and resume information including their name 456 is displayed 78. If the status is not active 454, another status is checked for anonymous retrieval 460. All records where retrieval 452 is not allowed 460 are skipped. When retrieval 452 of the applicant is allowed 460, all records of resume information without the applicant's name 462 are then decrypted and decompressed for display 78. After all records are displayed 78, the program can perform another search 464. If the subscriber 96 is interested in contacting the anonymously represented applicant 466, the provider 94 can be contacted by telephone or through the Internet 144 via the transceiver 92 of the computer system 32 to act as an intermediary and broker the negotiations between the subscriber 96 and applicant 466. The function of brokering can be applied to other applications (e.g. personal ads, auctions, sealed bids, etc. as listed above) where client confidentiality is requested.

The practice of encryption and compression is not limited to this aspect but rather can be applied to the invention in general. For instance, a prudent measure for protecting the confidentiality of information is to have a sole centralized source. Copies of this source, particularly if such copies are distributed, increase the possibility of compromising the security of the information. Because of this, it remains unobvious to distribute confidential/unreleased information in advance. Advantage can be taken by the advanced distribution of unreleased (e.g. press releases, copyrighted materials such as literary works, music, movies, etc.) or confidential (e.g. classified or top secret government information, trade secret information or the like) material which carries an encryption (public-key, PGP, etc.) strong enough to not be decoded before the release or declassification of such material. By using advanced distribution the final delivery of data sent (e.g. control/reference data and/or decryption key) is minimized for a subscriber or the public to access at least a subset of the encrypted material that allows for the synchronization of simultaneous access to the dissemination of new information by a wider population, particularly when it is unclear as to exactly when the material is to be released.

For instance, a provider of information such as Press Release (PR) firm releases the Internet encrypted materials of client press releases. The target date for releasing material to the public for client A is three weeks later. However, two days before the release date, the client requests a release date change due to delays in promoting a new campaign. Control/reference data is distributed on the new release date that corresponds to client A within the batch of encrypted material distributed by the PR firm. The invention combines the encrypted material with the control data to display for review to a subscriber or the public a decrypted portion of the encrypted material, which in this case releases new information concerning client A. As a result network bandwidth is significantly reduced while eliminating the step of first distributing the full material.

When the future release of existing information may be extremely time sensitive or have application to a first come first serve system it is of increased importance to synchronize the release of the information so that the public or as many subscribers/clients as possible have equal opportunity to access or receive such released materials at the same time in order to make decisions and/or respond to such information accordingly. If the material is not distributed in advance, the problems of bandwidth and bottlenecking in a network will occur when too many people are trying to access such information simultaneously. By distributing the encrypted material in advance, as discussed reduces bandwidth and minimizes the final delivery of information allowing the public or subscribers to simultaneously access the newly released material. In addition, time zones are taken into account through authentication of subscriber location or based on Global Positioning System (GPS) technology to assure that the final delivery of a decryption key, for example, can propagate through any public network such as the Internet via satellite or other form of transmission allowing for maximum simultaneous distributed access to previously distributed encrypted materials or a subset thereof for the purpose of releasing new information. In addition, the encrypted material can be distributed in advance and cached by sending such material to geographically scattered licensed service providers for use in tiered subscribing applications.

Control/reference data is the representation of an updated status that is dependent upon knowing when a status will change but not what, knowing what status will be changed but not when, and knowing neither what status will be changed nor when a status will change. The aspects discussed focus primarily on the change in status of potentially reusable data. Furthermore, indexes are not limited to being created remotely at the subscriber site. For cases where the delivery time of the indexes does not exceed the time needed to create the indexes at the subscriber site, the provider sends the indexes. Though control data as an encoded bit mask represents the most efficient way to send update information of the present aspect, data updates are not limited to being sent in the form of an encoded bit mask. A database of identifiers such as premature expired patent numbers, telephone numbers or domain names, for instance, can be sent instead. Furthermore, potentially reusable data can be more specifically defined in terms of potentially usable and/or potentially reusable data. Press releases, wills, and the declassification of confidential information or the like that have a one-time use at a future date, serve as examples of potentially usable data.

Though the issue date, expiry date, release date, renewal date, anniversary date, or the like may have a known (one time or periodic) date/time in advance, such a date/time event may be subject to change with little or no notice creating an uncertainty as to when new information is delivered/available. There is a degree of fuzziness as to when an event may occur, known as a "fuzzy date" or "fuzzy expiration" which affects the delivery of newly issued information, potentially reusable information, or control/reference data. Co-pending provisional application No. 60/154,411 is applied to process these "fuzzy dates" in order to assure information delivery, data updates, and compilation of new information as discussed in the present invention.

The invention has use in a business/legal environment. For example, reference files are maintained containing data that is used in conjunction with various software applications. For instance in a law firm database, rules, regulations, citations, and various statutory dates and deadlines are stored in files that are referenced by software applications that use the reference data in making computations and decisions. If the reference data is incorrect, then it is highly probable that the output computation and/or decision made by the software is erroneous. Thus, if update reference data were stored in conjunction with regular data that is to be applied to the system (in a similar manner to that described above with respect to the data reference updates), the system would be using the most recent reference data.

Further uses of the present invention include configuring the preset query to flag a group of patents or trademarks that the subscriber is licensing technology from. This customized information assures the subscriber that they're not continuing to pay licensing or royalty fees on a premature expired patent or trademark. By gaining competitive intelligence on abandoned patents and technologies, a subscriber can better evaluate the research and development costs of similar work. For example, a corporation will seek the counsel of a patent law firm to evaluate the potential that their new product may infringe on the intellectual property of a competitor. A competitive intelligence search is performed by the law firm, and all patents and trademarks in question are further searched for premature patent and trademark expiration as information to be used in advising the client that a patent or trademark that may infringe no longer infringes due to the determination of expiration.

By providing premature expired patents that can be made, used, or sold by anyone, the use of the clipping service to automate subscriber access allows for a new non-technical audience outside of the legal, corporate, and scientific communities to become familiarized with the patent system. Via the Internet, this information can be disseminated to any person in the world with access to a computer and a network or dial-up connection. In addition, professors of science and engineering at universities can now incorporate this lapsed property for use in their syllabus in the form of lab experiments and homework assignments. In addition, the publishing of all resulting statistics associated with premature expired information becomes of new use as well. For instance, the ratio of expirations can be compared law firms to help inform an inventor as to what law firm to select for assistance. Other statistics include that of expirations across companies, geography, and industry as well. Though the detailed description illustrates the invention from a provider/subscriber point of view, the invention does not rely on both parties and can be practiced separately by either party.

Although the invention has been shown and described with respect to a certain preferred aspect or aspects, it is obvious that equivalent alterations. and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as stated in the following claims.

I claim:

1. In a communication network having at least one communication link connecting a provider and a client, wherein the provider is in communication with a registrar storing one or more identifiers, a method comprising the steps of:
   communicating from the provider to the client said one or more identifiers wherein each said identifier is a potentially available or soon to be available telephone number or domain name and each said identifier is not available for registration at the time of said communication;
   selecting at least one identifier from said one or more identifiers; and,
   at least one of a reserving, subscribing, reserving in a pre-ordering queue, pre-ordering, preregistering, ordering, and monitoring said at least one selected identifier with the provider, wherein said at least one selected identifier is communicated to the provider before said at least one selected identifier is available for registration.

2. A method, as set forth in claim 1, wherein said registrar is also the provider.

3. A method, as set forth in claim 1, wherein said registrar is one of a domain name registrar and telephone registrar.

4. A method, as set forth in claim 1, wherein the client is one of a subscriber and registrant and the provider is one of a telephone company and registration provider.

5. A method, as set forth in claim 1, wherein the communication network is one of telephone network and Internet.

6. A method, as set forth in claim 1, further including determining that a newly available domain name corresponds to said at least one selected identifier.

7. A method, as set forth in claim 6, further including automatically attempting to register said newly available domain name with said registrar in response to determining that said newly available domain name corresponds to said at least one selected identifier.

8. In a communication network having a computer system including a storage facility with an executable computer program stored therein, a method, as set forth in claim 1, wherein selecting said at least one identifier includes executing said computer program to assist in making said selection.

9. A method, as set forth in claim 8, wherein said executing said computer program includes at least one of a client and provider executing said computer program.

10. A method, as set forth in claim 8, wherein said executing said computer program includes determining whether said one or more identifiers has one of a personal significance, vanity, commercial interest, and commercial purpose to the client.

11. A method, as set forth in claim 8, wherein said executing said computer program includes converting one of a plurality of digits into a mnemonic expression and mnemonic expression into a plurality of digits.

12. In a computer system having a storage facility, a method for receiving new information from a provider comprising the steps of;
   storing a first data received from the provider at a first time, said first data including information of first use wherein at least a portion of said first data is potentially reusable;
   storing a second data received from the provider at a second time, said second data including reference data, said reference data indicating that at least a portion of said potentially reusable portion of said first data is reusable wherein one of a reference data and second time is unknown at said first time; and,
   generating from said reference data and said first data, a third data having information of second use independent of said first use wherein said third data comprises updated subset of said first data, wherein at least a portion of said third data is potentially reusable and said third data includes one of a soon to be available data, newly available data, and newly issued data.

13. A method, as set forth in claim 12, wherein at least one of a first data and reference data is periodically stored.

14. A method, as set forth in claim 12, wherein one of a first data, second data, and third data includes newly issued data.

15. A method, as set forth in claim 14, wherein at least a portion of said newly issued data is potentially reusable.

16. A method, as set forth in claim 12, wherein said second data includes news and advertising data.

17. A method, as set forth in claim 12, wherein one of a first data and second data includes an executable computer program.

18. A method, as set forth in claim 12, wherein at least one of a first data and second data is copied from a computer readable medium to said storage facility.

19. A method, as set forth in claim 12, wherein said storage facility is at least one cache and at least a portion of one of a first data, second data, and third data is stored in said cache.

20. A method, as set forth in claim 12, wherein at least one of a first data, second data, and third data includes at least one of an issue date, expiry date, release date, due date, soon to be available date, renewal date, fuzzy date, and anniversary date.

21. A method, as set forth in claim 20, wherein at least one of a first data, second data, and third data is partitioned by at least one of an issue date, expiry date, release date, due date, soon to be available date, renewal date, fuzzy date, and anniversary date.

22. A method, as set forth in claim 20, wherein said storing said first data further includes storing said first data at a first time corresponding to one of an issue date, expiry date, release date, due date, soon to be available date, renewal date, fuzzy date, and anniversary date.

23. A method, as set forth in claim 20, wherein said storing said second data further includes storing said second data at a second time corresponding to one of an issue date, expiry date, release date, due date, soon to be available date, renewal date, fuzzy date, and anniversary date.

24. A method, as set forth in claim 20, wherein said generating said third data further includes generating said third data at a third time corresponding to one of an issue date, expiry date, release date, due date, soon to be available date, renewal date, fuzzy date, and anniversary date.

25. A method, as set forth in claim 20, wherein the time difference between said soon to be available date and one of an issue date, expiry date, release date, due date, and renewal date is one of a publication period, subscription period, expiration period, holding period, pending period, and grace period.

26. A method, as set forth in claim 12, wherein at least one of a first data, second data, and third data includes information such as but not limited to patents, trademarks, domain names, telephone numbers, uniform resource identifiers, copyrights, real estate, property for sale—lease—rent—forfeiture, judgements, mortgage, liens, auctions, job descriptions, resumes, coupons, rebates, offers, seasonal advertising, personal ads, classifieds, news, price lists, song lists, periodicals, library books, leasing, licensing, rentals, arrival/departure records, liquor licenses, parole dates, rules, regulations, citations, press releases, and confidential information.

27. A method, as set forth in claim 12, wherein said generating said third data includes generating said third data in response to storing said second data.

28. In a storage facility having an executable computer program stored therein, a method, as set forth in claim 12, wherein said generating said third data includes executing the computer program for combining said reference data with said first data.

29. A method, as set forth in claim 28, further including executing the program to configure, query, browse, select, report, archive, order, or hyperlink to the Internet from at least one of a first data, second data, and third data.

30. A method, as set forth in claim 28, further including filtering said third data in response to generating said third data.

31. In an executable computer program having a search engine, a method, as set forth in claim 28, further including using said search engine to search and retrieve from at least one of a first data, second data, and third data.

32. A method, as set forth in claim 28, wherein said first data includes a master database and said reference data includes at least one of a query and encoded bit mask.

33. A method, as set forth in claim 28, further including executing the program for combining said query with said master database to generate a first data subset, combining said reference data with said first data subset to generate a second data subset, and combining a user defined query with said second data subset to generate a third data subset.

34. A method, as set forth in claim 28, wherein said second data includes newly issued data and said reference data, further including executing the program to generate a fourth data by combining said newly issued data and at least a remaining portion of said first data which does not correspond to said reference data.

35. A method, as set forth in claim 28, wherein said fourth data can be used as said first data.

36. In a network having a first provider computer system and a first subscriber computer system having a storage facility and at least one communication link connecting the first provider computer system and the first subscriber computer system, a method, as set forth in claim 12, wherein the first provider computer system is operated by a first provider, and the first subscriber computer system is operated by a first subscriber.

37. A method, as set forth in claim 36, wherein one of a first provider and first subscriber is one of an application service provider and internet service provider.

38. A method, as set forth in claim 36, wherein said first provider is a provider of sole-source data.

39. A method, as set forth in claim 36, wherein said first subscriber is a tiered subscriber and the first subscriber system is also a second provider system having at least one communication link connecting said second provider computer system with a second subscriber computer system.

40. A method, as set forth in claim 36, wherein said storage facility is at least one network cache and at least one of a first data, second data, and third data is stored in said network cache.

41. An apparatus for receiving new information from a provider comprising:

a computer system having a storage facility;

means for storing a first data received from the provider at a first time, said first data including information of first use wherein at least a portion of said first data is potentially reusable;

means for storing a second data received from the provider at a second time, said second data including reference data, said reference data indicating that at least a portion of said potentially reusable portion of said first data is reusable wherein one of a reference data and second time is unknown at said first time; and, means for generating from said reference data and said first data, a third data having information of second use independent of said first use wherein said third data comprises updated subset of said first data, wherein at least a portion of said third data is potentially reusable and said third data includes one of a soon to be available data newly available data, and newly issued data.

42. A computer program product comprising computer readable program code stored on a computer readable medium, the program code adapted to execute the method for receiving new information from a provider including storing a first data received from the provider at a first time, said first data including information of first use wherein at least a portion of said first data is potentially reusable, storing a second data received from the provider at a second time, said second data including reference data, said refer ence data indicating that at least a portion of said potentially reusable portion of said first data is reusable wherein one of a reference data and second time is unknown at said first time, and generating from said reference data and said first data, a third data having information of second use independent of said first use wherein said third data comprises updated subset of said first data, wherein at least a portion of said third data is potentially reusable and said third data includes one of a soon to be available data, newly available data, and newly issued data.

* * * * *

UNITED STATES PATENT AND TRADEMARK OFFICE
CERTIFICATE OF CORRECTION

PATENT NO.     : 6,442,549 B1                                        Page 1 of 1
DATED          : August 27, 2002
INVENTOR(S)    : Eric Schneider It is certified that error appears in the above-identified patent and that said Letters Patent is hereby corrected as shown below:

Column 9,
Line 43, insert -- In general, in accordance with the present invention, in a communication network having at least one communication link connecting a provider and a client, wherein the provider is in communication with a registrar storing one or more identifiers, a method includes the steps of communicating from the provider to the client the one or more identifiers wherein each identifier is a potentially available or soon to be available telephone number or domain name and each identifier is not available for registration at the time of the communication, selecting at least one identifier from the one or more identifiers, and at least one of a reserving, subscribing, reserving in a pre-ordering queue, pre-ordering, pre-registering, ordering, and monitoring the at least one selected identifier with the provider, wherein the at least one selected identifier is communicated to the provider before the at least one selected identifier is available for registration.

In accordance with an aspect of the present invention, in a computer system having a storage facility, a method for receiving new information from a provider includes the steps of storing a first data received from the provider at a first time, the first data including information of first use wherein at least a portion of the first data is potentially reusable, storing a second data received from the provider at a second time, the second data including reference data, the reference data indicating that at least a portion of the potentially reuseable portion of the first data is reuseable wherein one of a reference data and second time is unknown at the first time, and generating from the reference data and the first data, a third data having information of second use independent of the first use wherein the third data comprises updated subset of the first data, wherein at least a portion of the third data is potentially reusable and the third data includes one of a soon to be available data, newly available data, and newly issued data. --

Signed and Sealed this

Fifteenth Day of April, 2003

JAMES E. ROGAN
*Director of the United States Patent and Trademark Office*